US012246258B2

(12) United States Patent
Baba et al.

(10) Patent No.: US 12,246,258 B2
(45) Date of Patent: Mar. 11, 2025

(54) RECORDING MEDIUM HAVING RECORDED THEREON GAME PROGRAM, GAME METHOD, AND TERMINAL APPARATUS

(71) Applicant: COLOPL, Inc., Tokyo (JP)

(72) Inventors: Naruatsu Baba, Tokyo (JP); Jiro Taoka, Tokyo (JP)

(73) Assignee: COLOPL, Inc., Tokyo (JP)

( * ) Notice: Subject to any disclaimer, the term of this patent is extended or adjusted under 35 U.S.C. 154(b) by 0 days.

(21) Appl. No.: 17/952,352

(22) Filed: Sep. 26, 2022

(65) Prior Publication Data

US 2023/0020282 A1 Jan. 19, 2023

Related U.S. Application Data

(63) Continuation of application No. PCT/JP2021/011041, filed on Mar. 18, 2021.

(30) Foreign Application Priority Data

Mar. 27, 2020 (JP) ................................ 2020-057860

(51) Int. Cl.
*A63F 13/65* (2014.01)
*A63F 13/45* (2014.01)
(Continued)

(52) U.S. Cl.
CPC .............. *A63F 13/65* (2014.09); *A63F 13/45* (2014.09); *A63F 13/54* (2014.09); *G06F 3/16* (2013.01);
(Continued)

(58) Field of Classification Search
CPC .......... A63F 13/65; A63F 13/45; A63F 13/54; A63F 2300/6081; A63F 2300/69; G06F 3/16; H04W 4/023
See application file for complete search history.

(56) References Cited

U.S. PATENT DOCUMENTS 9,338,622 B2    5/2016  Bjontegard
9,526,984 B2 *  12/2016 Thomas ................. A63F 13/60
(Continued)

FOREIGN PATENT DOCUMENTS

JP    2018000623 A   1/2018
JP    2018108429 A   7/2018
(Continued)

OTHER PUBLICATIONS

International Search Report and (ISA/237) Written Opinion of the International Search Authority for International Patent Application No. PCT/JP2021/011041, mailed by the Japan Patent Office on Jun. 8, 2021.

(Continued)

*Primary Examiner* — Malina D. Blaise

(57) ABSTRACT

A game based on a game program includes a game configured to progress by moving a location of a terminal apparatus possessed by a user, the game program causing a processor to perform enabling the game to progress by using predetermined moving means to move the terminal apparatus by the user who possesses the terminal apparatus, and announcing information for the user using a display unit in a non specific mode other than during a game progressing by using the predetermined moving means to move the location of the terminal apparatus, and announcing the information for the user using an output unit other than the display unit in a specific mode during the game progressing by using the predetermined moving means to move the location of the terminal apparatus.

13 Claims, 11 Drawing Sheets

(51) Int. Cl.
*A63F 13/54* (2014.01)
*G06F 3/16* (2006.01)
*H04W 4/02* (2018.01)

(52) U.S. Cl.
CPC ..... *H04W 4/023* (2013.01); *A63F 2300/6081* (2013.01); *A63F 2300/69* (2013.01)

(56) References Cited

U.S. PATENT DOCUMENTS

| | | | | |
|---|---|---|---|---|
| 10,134,061 | B2* | 11/2018 | Serino | G09F 9/30 |
| 10,646,783 | B1* | 5/2020 | Hibbert | A63F 13/5378 |
| 10,809,091 | B2* | 10/2020 | Otero Diaz | G01C 21/3667 |
| 11,207,595 | B2* | 12/2021 | Nakamura | A63F 13/35 |
| 11,541,315 | B2* | 1/2023 | Kornmann | G07F 17/3225 |
| 11,638,869 | B2* | 5/2023 | Gotoh | A63F 13/48 |
| | | | | 463/36 |
| 2009/0005140 | A1* | 1/2009 | Rose | A63F 13/56 |
| | | | | 463/40 |
| 2011/0151971 | A1* | 6/2011 | Altshuler | A63F 13/497 |
| | | | | 463/30 |
| 2011/0319148 | A1* | 12/2011 | Kinnebrew | G06V 20/42 |
| | | | | 463/43 |
| 2012/0253488 | A1* | 10/2012 | Shaw | G06Q 10/04 |
| | | | | 700/91 |
| 2013/0113655 | A1* | 5/2013 | Shen | G01C 21/005 |
| | | | | 342/357.31 |
| 2013/0262203 | A1* | 10/2013 | Frederick | G06Q 30/0209 |
| | | | | 705/14.58 |
| 2014/0094153 | A1* | 4/2014 | Barbulescu | H04L 67/10 |
| | | | | 455/414.1 |
| 2014/0128146 | A1* | 5/2014 | Story, Jr. | A63F 13/00 |
| | | | | 463/36 |
| 2014/0274404 | A1* | 9/2014 | Hoskins | A63F 13/335 |
| | | | | 463/42 |
| 2015/0088624 | A1* | 3/2015 | Frederick | G06Q 30/0209 |
| | | | | 705/14.12 |
| 2016/0016083 | A1 | 1/2016 | Davis | |
| 2016/0085430 | A1* | 3/2016 | Moran | H04M 1/72454 |
| | | | | 715/765 |
| 2016/0306173 | A1* | 10/2016 | Tsukahara | G02B 27/02 |
| 2016/0351049 | A1* | 12/2016 | Hamada | H04M 1/724098 |
| 2018/0032203 | A1* | 2/2018 | Sepulveda | G06F 1/1615 |
| 2018/0075493 | A1* | 3/2018 | Agarwal | G06Q 30/0261 |
| 2018/0288213 | A1 | 10/2018 | Bjontegard | |
| 2020/0198658 | A1* | 6/2020 | Suzuki | B60W 10/30 |
| 2020/0215437 | A1* | 7/2020 | Kidera | A63F 13/216 |
| 2020/0217682 | A1* | 7/2020 | Grochocki, Jr. | G01C 21/3492 |
| 2020/0406143 | A1* | 12/2020 | Nakamura | G09B 29/00 |
| 2021/0356288 | A1* | 11/2021 | Hajj | G01C 21/3492 |
| 2021/0400142 | A1* | 12/2021 | Jorasch | H04L 65/1069 |
| 2023/0020282 | A1* | 1/2023 | Baba | A63F 13/216 |
| 2023/0026521 | A1* | 1/2023 | Gray | H04W 4/38 |

FOREIGN PATENT DOCUMENTS

| | | |
|---|---|---|
| JP | 2019170966 A | 10/2019 |
| JP | 2019177090 A | 10/2019 |

OTHER PUBLICATIONS

Extended European Search Report for counterpart European Application No. 21776332.5, issued by the European Patent Office on Mar. 14, 2024.

\* cited by examiner

| GAME MEDIUM NAME | EFFECT |
|---|---|
| MATERIAL | ENABLES ENHANCEMENT OF WEAPON ETC. |
| REQUEST FORM | ENABLES PARTICIPATION TO QUEST ACCORDING TO REQUEST FORM |
| OBJECT | INCREASE OFFENSIVE POWER LEARN NEW SKILL |

FIG.4F

RECORDING MEDIUM HAVING RECORDED THEREON GAME PROGRAM, GAME METHOD, AND TERMINAL APPARATUS

The contents of the following Japanese patent application(s) are incorporated herein by reference:
NO. 2020-057860 filed in JP on Mar. 27, 2020
NO. PCT/JP2021/011041 filed in WO on Mar. 18, 2021

BACKGROUND

1. Technical Field

The present invention relates to a recording medium having recorded thereon a game program, and also relates to a game method and a terminal apparatus.

2. Related Art

A game using location information of a terminal apparatus such as a smartphone possessed by a user has been commonly known. For example, Patent document 1 describes that a movement distance of a player is determined based on location information of the player, and a result thereof is reflected on a game.

PRIOR ART LITERATURE

Patent Document

Patent document 1: Japanese Patent Application Publication No. 2019-170966

In a conventional location-based game, it is assumed that a player makes a movement on foot, and the game is caused to progress while accepting a predetermined input operation. However, the player can also play the game by making a movement using moving means such as a car although not an entire movement distance is to be reflected on the game. In this case, for example, there was a risk that so-called distracted driving would be encouraged in which a user is caused to look aside towards a game screen while driving.

BRIEF DESCRIPTION OF THE DRAWINGS

FIG. 4F illustrates an example of a display screen to be displayed on a display unit during a location-based game, in which an example illustrating an effect exerted in a battle game by a game medium granted in the location-based game is illustrated.

DESCRIPTION OF EXEMPLARY EMBODIMENTS

A game system according to the present disclosure is a system for providing a game to a plurality of users. Hereinafter, the game system will be described with reference to the drawings. Note that the present invention is not limited to these exemplifications and is illustrated in the scope of claims, and all alterations within a meaning and a range equivalent to the scope of claims are intended to be included in the present invention. In the following description, a same reference sign is assigned to a same element in the description of the drawings, and a duplicated description will not be repeated.

Hardware configuration of game system 1

Figure 1:
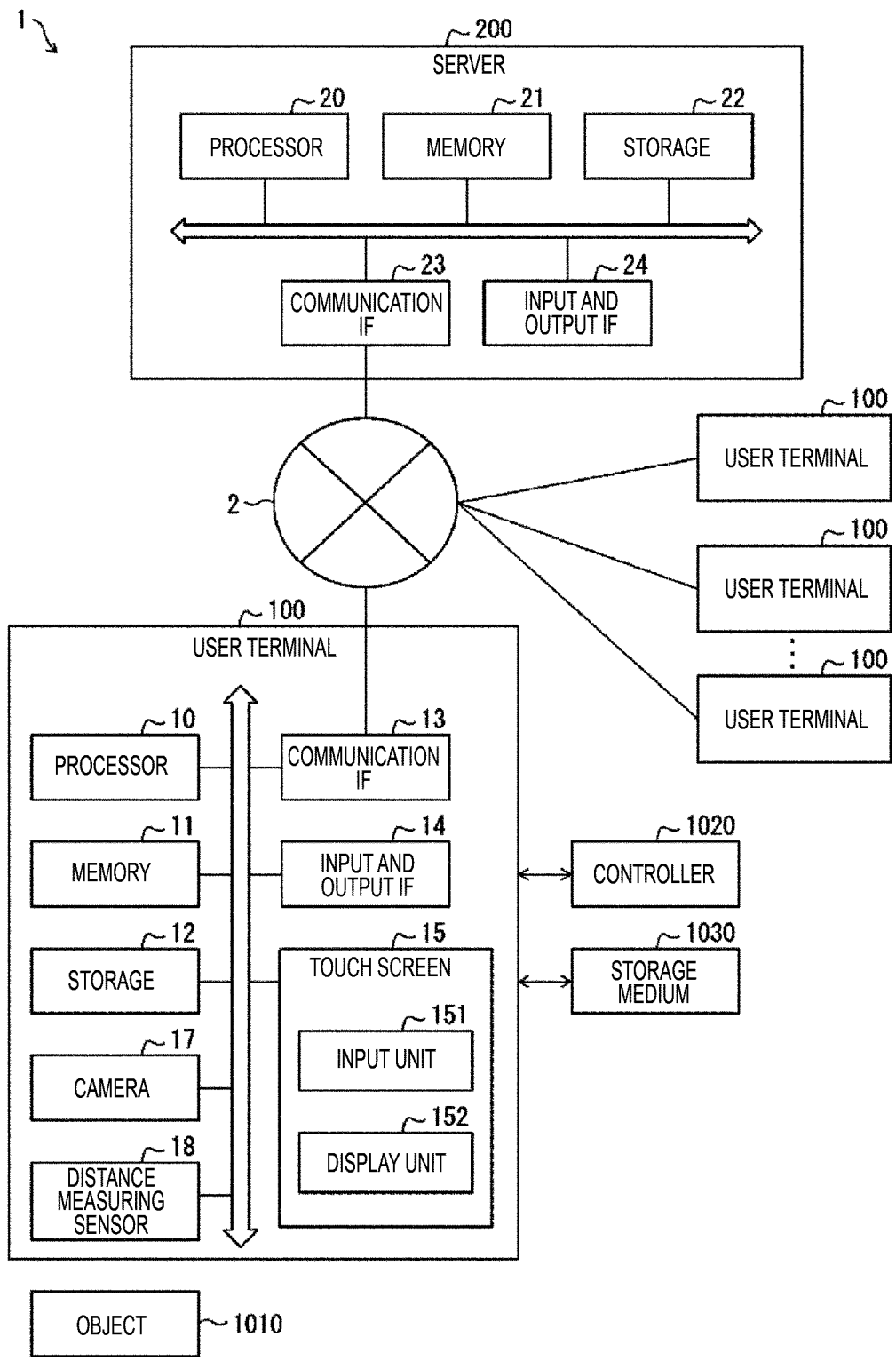
FIG. 1 illustrates a hardware configuration of a game system.

FIG. 1 illustrates a hardware configuration of a game system 1. As illustrated in the drawing, the game system 1 includes a plurality of terminal apparatuses 100 and a server 200. Each of the terminal apparatuses 100 is connected to the server 200 via a network 2. The network 2 is configured by the Internet and various types of mobile communication systems and the like constituted by radio base stations which are not illustrated in the drawing. Examples of this mobile communication system include, for example, so-called 3G and 4G mobile communication systems, Long Term Evolution (LTE), a wireless network connectable to the Internet by a predetermined access point (for example, Wi-Fi (registered trademark)), and the like.

The server 200 (a computer or an information processing apparatus) may be a work station or a general use computer such as a personal computer. The server 200 includes a processor 20, a memory 21, a storage 22, a communication interface (IF) 23, and an input and output IF 24. These components included in the server 200 are electrically connected to each other by a communication bus.

The terminal apparatus 100 (a computer or an information processing apparatus) may be a mobile terminal such as a smartphone, a feature phone, a personal digital assistant (PDA), or a tablet type computer. The terminal apparatus (also referred to as a user terminal) 100 may be a game apparatus suitable for game play. As illustrated in the drawing, the terminal apparatus 100 includes a processor 10, a memory 11, a storage 12, a communication interface (IF) 13, an input and output IF 14, a display unit 15, a camera 17, and a distance measuring sensor 18. These components included in the terminal apparatus 100 are electrically connected to each other by a communication bus. Note that, the terminal apparatus 100 may include, instead of or in addition to the display unit 15, the input and output IF 14 to which a display (display unit) constituted to be separate from a main body of the terminal apparatus 100 is connectable.

In addition, as illustrated in FIG. 1, the terminal apparatus 100 may be configured to be communicable with one or more controllers 1020. The controller 1020 is configured to establish communication with the terminal apparatus 100 according to a communication standard such as, for example, Bluetooth (registered trademark). The controller 1020 may have one or more buttons or the like, and the controller transmits, to the terminal apparatus 100, an output value based on an input operation by a user to the button or the like. In addition, the controller 1020 may have various types of sensors such as an acceleration sensor and an angular rate sensor, and the controller transmits output values of the various types of sensors to the terminal apparatus 100.

Note that instead of or in addition to the configuration in which the terminal apparatus 100 includes the camera 17 and the distance measuring sensor 18, the controller 1020 may have the camera 17 and the distance measuring sensor 18.

For example, when the game is to be started, the terminal apparatus 100 desirably causes a user using the controller 1020 to input user identification information such as a name or a login ID of the user via the controller 1020. With this configuration, the terminal apparatus 100 can link the controller 1020 with the user, and based on a transmission source (controller 1020) of a received output value, it is possible to identify which user has transmitted the output value.

In a case where the terminal apparatus 100 communicates with a plurality of the controllers 1020, each of the users holds each of the controllers 1020, thereby enabling the single terminal apparatus 100 to achieve multi-play without communicating with another apparatus such as the server 200 via the network 2. In addition, each of the terminal apparatuses 100 establishes communication connection with each other by a wireless standard such as a wireless local area network (LAN) standard or the like (establishing communication connection without the intermediation of the server 200), thereby enabling multi-play to be achieved locally by the plurality of terminal apparatuses 100. When the above described multi-play is to be locally achieved by the single terminal apparatus 100, the terminal apparatus 100 may further include at least some of various functions included in the server 200 which will be described below. In addition, when the above described multi-play is to be locally achieved by the plurality of terminal apparatuses 100, the various functions included in the server 200 which will be described below may be included in the plurality of terminal apparatuses 100 in a distributed manner.

Note that even when the above described multi-play is to be locally achieved, the terminal apparatus 100 may perform communication with the server 200. For example, information indicating a play result such as a score or winning/losing in a certain game may be transmitted to the server 200 in association with the user identification information.

In addition, the controller 1020 may be configured to be detachably attached to the terminal apparatus 100. In this case, a coupling section to the controller 1020 may be provided on at least any surface in a housing of the terminal apparatus 100. When the terminal apparatus 100 is coupled to the controller 1020 via the coupling section by a wiring, the terminal apparatus 100 and the controller 1020 transmit and receive a signal via the wiring.

As illustrated in FIG. 1, the terminal apparatus 100 may accept attachment of a storage medium 1030 such as an external memory card via the input and output IF 14. With this configuration, the terminal apparatus 100 can read a program and data recorded on the storage medium 1030. The program to be recorded on the storage medium 1030 is, for example, a game program.

The terminal apparatus 100 may store the game program acquired by communicating with an external apparatus such as the server 200 in the memory 11 of the terminal apparatus 100, or may store the game program acquired by reading from the storage medium 1030 in the memory 11.

As described above, the terminal apparatus 100 includes the communication IF 13, the input and output IF 14, the display unit 15, the camera 17, and the distance measuring sensor 18 as an example of a mechanism for inputting the information to the terminal apparatus 100. Each of the units described above as the input mechanism can be regarded as an operation unit configured to accept the input operation by the user.

For example, when the operation unit is constituted by at least either the camera 17 or the distance measuring sensor 18, the operation unit is configured to detect an object 1010 near the terminal apparatus 100 and identify the input operation from the detection result of the object. As an example, a hand of the user, a marker of a preset shape, or the like is detected as the object 1010, and the input operation is identified based on a color, a shape, a motion, a type, or the like of the object 1010 which is obtained as a detection result. More specifically, when the hand of the user is detected from a captured image of the camera 17, the terminal apparatus 100 identifies and accepts, as the input operation by the user, a gesture (a series of motions of the hand of the user) detected based on the captured image. Note that the captured image may be a still image or a moving image.

Alternatively, when the operation unit is constituted by the display unit 15, the terminal apparatus 100 identifies and accepts, as the input operation by the user, the operation of the user which is performed on the input unit 151 of the display unit 15. Alternatively, when the operation unit is constituted by the communication IF 13, the terminal apparatus 100 identifies and accepts, as the input operation by the user, a signal (for example, an output value) transmitted from the controller 1020. Alternatively, when the operation unit is constituted by the input and output IF 14, the terminal apparatus 100 identifies and accepts, as the input operation by the user, a signal output from an input apparatus (not illustrated in the drawing) which is different from the controller 1020 connected to the input and output IF 14.

Hardware Component of each Apparatus

The processor 10 is configured to control an entire operation of the terminal apparatus 100. The processor 20 is configured to control an entire operation of the server 200. The processors 10 and 20 include a central processing unit (CPU), a micro processing unit (MPU), and a graphics processing unit (GPU).

The processor 10 reads programs from the storage 12 described below to be developed onto the memory 11 described below. The processor 20 reads programs from the storage 22 described below to be developed onto the memory 21 described below. The processor 10 and the processor 20 execute the developed programs.

The memories 11 and 21 are main storage devices. The memories 11 and 21 are constituted by storage devices such as a read only memory (ROM) and a random access memory (RAM). The memory 11 temporarily stores the programs and various types of data read from the storage 12 described below by the processor 10 to provide a working area to the processor 10. The memory 11 also temporarily stores various types of data generated while the processor 10 operates according to the programs. The memory 21 temporarily stores the various types of programs and data read from the storage 22 described below by the processor 20 to provide a working area to the processor 20. The memory 21 also temporarily stores various types of data generated while the processor 20 operates according to the programs.

In the present embodiment, the program may be a game program for achieving a game by the terminal apparatus 100. Alternatively, the program may be a game program for achieving the game by cooperation between the terminal apparatus 100 and the server 200. Note that the game to be achieved by the cooperation between the terminal apparatus 100 and the server 200 may be a game to be performed on a browser activated on the terminal apparatus 100 as an example. Alternatively, the program may be a game program for achieving the game by cooperation between the plurality of terminal apparatuses 100. In addition, the various types of data include data related to a game such as user information and game information, and an instruction or a notification transmitted or received between the terminal apparatus 100 and the server 200 or between the plurality of terminal apparatuses 100.

The storages 12 and 22 are auxiliary storage devices. The storages 12 and 22 are configured by storage devices such as a flash memory or a hard disk drive (HDD). Various types of data related to the game are stored in the storage 12 and the storage 22.

The communication IF 13 is configured to control transmission and reception of various types of data in the terminal apparatus 100. The communication IF 23 is configured to control transmission and reception of various types of data in the server 200. For example, the communication IFs 13 and 23 control communication via a wireless local area network (LAN), Internet communication via a wired LAN, a wireless LAN, or a mobile phone network, communication using short range wireless communication and the like.

The input and output IF 14 is an interface for the terminal apparatus 100 to accept an input of data, and also an interface for the terminal apparatus 100 to output data. The input and output IF 14 may perform the input and output of the data via a universal serial bus (USB) or the like. The input and output IF 14 may include, for example, a physical button of the terminal apparatus 100, a camera, a microphone, a speaker, or the like. The input and output IF 24 of the server 200 is an interface for the server 200 to accept an input of data, and also an interface for the server 200 to output data. The input and output IF 24 may include, for example, an input unit corresponding to an information input device such as a mouse or a keyboard, and a display unit corresponding to a device configured to display and output an image.

The display unit 15 of the terminal apparatus 100 is an electronic part in which an input unit 151 and a display unit 152 are combined with each other. The input unit 151 is, for example, a touch sensitive device, and is configured by a touch pad, for example. The display unit 152 is configured, for example, by a liquid crystal display, an organic electro-luminescence (EL) display, or the like.

The input unit 151 includes a function of sensing a location at which an operation of the user (mainly, a physical contact operation such as a touch operation, a slide operation, a swipe operation, and a tap operation) is input on an input surface, and transmitting information indicating the location as an input signal. It suffices when the input unit 151 includes a touch sensing unit which is not illustrated in the drawing. The touch sensing unit adopting any system such as an electrostatic capacitance system or a resistive film system may be used.

Although not illustrated in the drawing, the terminal apparatus 100 may include one or more sensors configured to identify a held posture of the terminal apparatus 100. This sensor may be, for example, an acceleration sensor, an angular rate sensor, or the like. When the terminal apparatus 100 includes a sensor, the processor 10 can identify the held posture of the terminal apparatus 100 from an output of the sensor, and perform processing according to the held posture. For example, when the terminal apparatus 100 is held in a portrait orientation, the processor 10 may perform a portrait screen display for displaying a vertically long image on the display unit 152. On the other hand, when the terminal apparatus 100 is held in a landscape orientation, the processor 10 may perform a landscape screen display for displaying a horizontally long image on the display unit. In this manner, a configuration may be adopted where the processor 10 can switch between the portrait screen display and the landscape screen display according to the held posture of the terminal apparatus 100.

The camera 17 includes an image sensor or the like, and is configured to generate a captured image by converting incident light that is incident from a lens into an electric signal.

The distance measuring sensor 18 is a sensor configured to measure a distance to a measurement target object. For example, the distance measuring sensor 18 includes a light source configured to emit pulse-converted light and a light-receiving element configured to receive light. The distance measuring sensor 18 measures the distance to the measurement target object based on light emission timing from the light source and light reception timing of reflected light generated when the light emitted from the light source has reached the measurement target object to be reflected. The distance measuring sensor 18 may have a light source configured to emit light having directivity.

Herein, an example will be further described in which the terminal apparatus 100 accepts, as the input operation by the user, a detection result obtained by using the camera 17 and the distance measuring sensor 18 to detect the object 1010 near the terminal apparatus 100. The camera 17 and the distance measuring sensor 18 may be provided on a side of the housing of the terminal apparatus 100, for example. The distance measuring sensor 18 may be provided near the camera 17. For example, an infrared camera can be used as the camera 17. In this case, an illumination apparatus configured to radiate infrared rays, a filter for shielding visible light, and the like may be provided in the camera 17. With this configuration, irrespective of whether is is outdoor or indoor, a detection accuracy of an object based on the captured image of the camera 17 can be further improved.

The processor 10 may perform one or more processes, for example, among processes illustrated in the following (1) to (5) on the captured image of the camera 17. (1) By performing image recognition processing on the captured image of the camera 17, the processor 10 identifies whether the hand of the user is included in the captured image. The processor 10 may use a technique such as, for example, pattern matching as an analysis technique adopted in the image recognition processing described above. (2) In addition, the processor 10 detects a gesture of the user from a shape of the hand of the user. The processor 10 identifies the number of at least one finger of the user (the number of at least one stretched finger) from the shape of the hand of the user detected from the captured image, for example. The processor 10 further identifies the gesture performed by the user from the identified number of the fingers. For example, when the number of fingers is five, the processor 10 determines that the user has performed a gesture of "paper" as in rock, paper, and scissors. In addition, when the number of fingers is zero (no finger is detected), the processor 10 determines that the user has performed a gesture of "rock". In addition, when the number of fingers is two, the processor 10 determines that the user has performed a gesture of "scissors". (3) By performing the image recognition processing on the captured image of the camera 17, the processor 10 detects whether a state is established in which only an index finger is held up among the fingers of the user or whether the fingers of the user have made a flicking motion. (4) The processor 10 detects a distance between the object 1010 near the terminal apparatus 100 (such as the hand of the user or the like) and the terminal apparatus 100 based on at least any one of an image recognition result of the captured image of the camera 17, an output value of the distance measuring sensor 18, and the like. For example, the processor 10 detects whether the hand of the user is near the terminal apparatus 100 (within a distance below a predetermined value, for example) or far from the terminal apparatus 100 (at a distance of the predetermined value or above, for example) based on a size of the shape of the hand of the user identified from the captured image of the camera 17. Note that when the captured image is a moving image, the processor 10 may detect whether the hand of the user is approaching the terminal apparatus 100 or moving away from the terminal apparatus 100. (5) When it is found, based on the image recognition result of the captured image of the camera 17 or the like, that the distance between the terminal apparatus 100 and the hand of the user changes while the hand of the user is being detected, the processor 10 recognizes that the user is waving their hand in a shooting direction of the camera 17. When an object is sometimes detected and is sometimes not detected in the distance measuring sensor 18 having more intense directivity compared with a shooting range of the camera 17, the processor 10 recognizes that the user is waving their hand in a direction orthogonal to the shooting direction of the camera.

In this manner, the processor 10 detects whether the user is squeezing their hand (corresponding to the gesture of "rock" or other gestures (for example, "paper")) by the image recognition on the captured image of the camera 17. In addition, the processor 10 detects how the user is moving this hand together with the shape of the hand of the user. In addition, the processor 10 detects whether the user is moving this hand to approach the terminal apparatus 100 or to be away from the terminal apparatus 100. Such an operation can be associated with an operation using a pointing device such as a mouse or a touch panel, for example. The terminal apparatus 100 moves a pointer on the display unit 15 according to the movement of the hand of the user, for example, to detect the gesture "rock" of the user. In this case, the terminal apparatus 100 recognizes that the user continues a selection operation. The continuation of the selection operation corresponds, for example, to a situation where the mouse is clicked and depressed and this state is being maintained or a situation where a touch down operation is performed on the touch panel and thereafter the touched state is maintained. In addition, when the user further moves the hand while the gesture "rock" of the user is being detected, the terminal apparatus 100 can recognize such a series of gestures as an operation corresponding to a swipe operation (or a drag operation). In addition, when a gesture of the user flicking the fingers is detected based on the detection result of the hand of the user by the captured image of the camera 17, the terminal apparatus 100 may recognize the gesture as an operation corresponding to a click of the mouse or a tap operation on the touch panel.

Functional Configuration of Game System 1

Functional Configuration of Server 200

Figure 2:
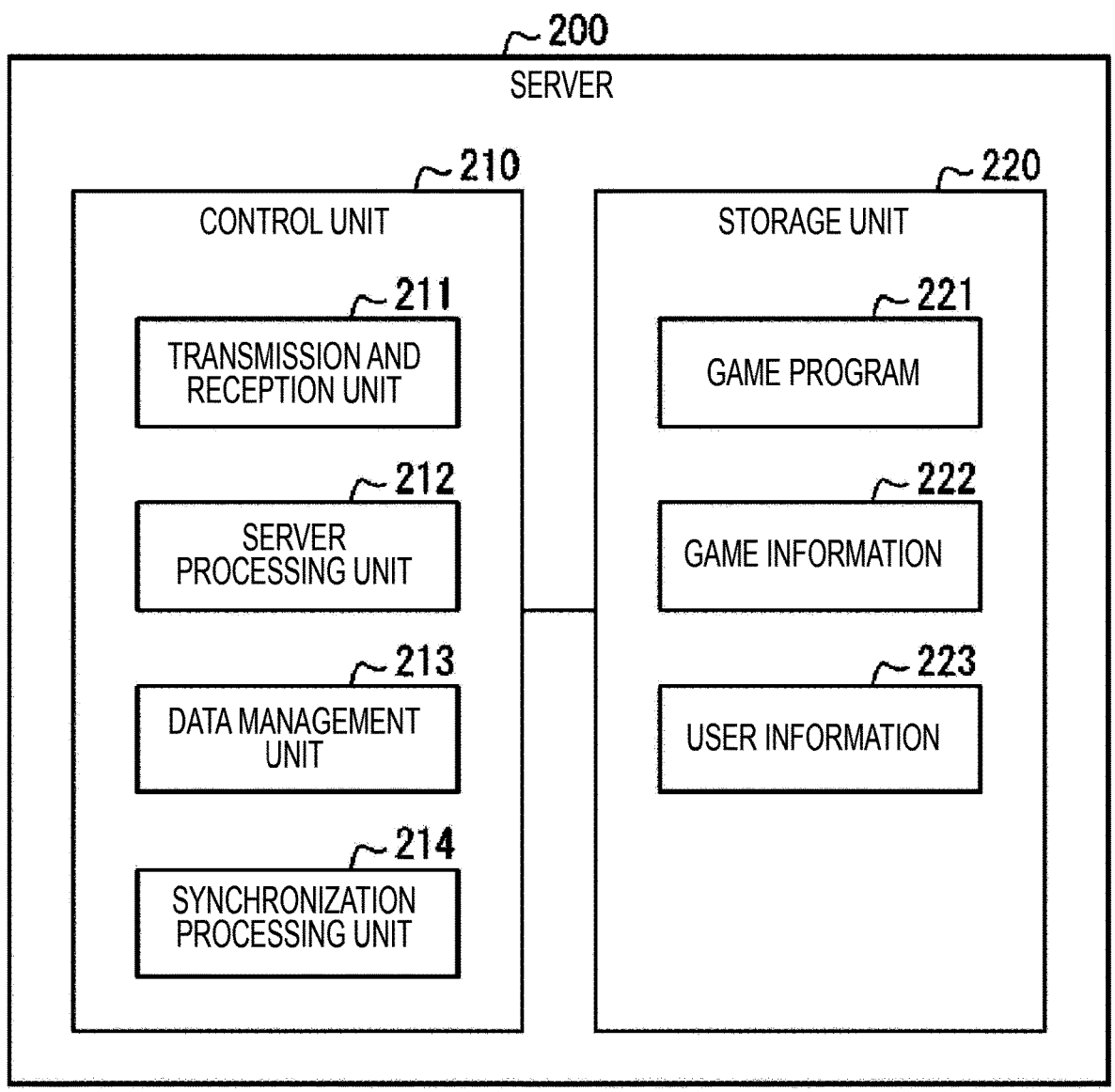
FIG. 2 is a block diagram illustrating a functional configuration of a server.

FIG. 2 is a block diagram illustrating a functional configuration of the server 200. The server 200 has a function of providing various types of data and programs required for achieving the game to each of the terminal apparatuses 100. The server 200 has a function of collecting and managing data related to the game from each of the terminal apparatuses 100. The server 200 has a function of performing synchronization processing among the plurality of terminal apparatuses 100.

Note that according to the present embodiment, the server 200 uses an account of the game which has been registered in advance to identify each of the users and the terminal apparatus 100. A registration method of the account is not particularly limited. For example, the terminal apparatus 100 or another apparatus such as a personal computer may transmit information required for registering the account of the user to the server 200 according to an operation of the user. Then, the server 200 may create and save the account of each of the users based on the received information.

When the terminal apparatus 100 uses any account to log in to the network 2 of the game system 1, the server 200 recognizes the terminal apparatus 100 that has logged in. Note that a login method and processing related to the login are not particularly limited. The server 200 and the terminal apparatus 100 may perform a login method that is conventionally known and various types of processing related to the login.

The server 200 is configured to function as a control unit 210 and a storage unit 220 in cooperation with the processor 20, the memory 21, the storage 22, the communication IF 23, the input and output IF 24, and the like.

The storage unit 220 is configured to store various types of data to be used by the control unit 210. The storage unit 220 stores a game program 221, game information 222, and user information 223.

The game program 221 is a program for achieving a game. The game information 222 and the user information 223 are data to be referred to when the game program 221 is executed.

Note that in addition to a game program to be executed on a server 200 side, the game program 221 may include a program (game program 121 described below) to be transmitted to the terminal apparatus 100 and executed on a terminal apparatus 100 side. Alternatively, the storage unit 220 may store both the game program 221 to be executed on the server 200 side and the program to be executed on the terminal apparatus side.

The game information 222 is information that is common among the accounts. The game information 222 may include information for defining various types of game spaces, for example. The "game space" refers to a space in which an object of an operation character operable by the user is arranged. The game information 222 may include various types of setting information related to a common object among the accounts such as an arrangement location, a size, a color, and a shape of a background object such as a tree, a rock, and a building and a non player character (NPC) object which are arranged in the game space. The game information 222 may include setting values of various types of parameters of the non player character. The game information 222 may include information according to a quest. The game information 222 may include information related to a winning probability of a lottery carried out in the game space. The quest is an event in the game in which an accomplishment condition is set. The accomplishment condition may be set for each of the quests. Note that in addition to the accomplishment condition, a failure condition may be set in the quest. In addition, a simple term "character" may be hereinafter used to refer to an object of a character arranged in the game space.

The user information 223 is information to be managed for each of the game accounts. The user information 223 may include, for example, information related to an operable character (hereinafter, referred to as an operation character), information related to possessed assets, information indicating a progress degree of the game, and the like. Herein, examples of the possessed assets include, for example, an in-game currency, an item, equipment of the character, and the like.

The control unit 210 is configured to control various types of processing related to the game by executing the game program 221 stored in the storage unit 220. The control unit 210 functions as a transmission and reception unit 211, a data management unit 213, and a server processing unit 212 by executing the game program 221.

The transmission and reception unit 211 is configured to transmit and receive various types of data. For example, the transmission and reception unit 211 receives transmission requests of various types of data and programs from the terminal apparatus 100, a synchronization request to support a multi-play function, data for synchronization, and the like, and transmits those to the server processing unit 212. For example, the transmission and reception unit 211 transmits the various types of data and programs to the terminal apparatus 100 according to an instruction from the server processing unit 212.

In the present embodiment, the "multi-play function" is a function of causing the game to progress while synchronizing the progresses of the games in a plurality of accounts with each other. When a plurality of accounts which have logged in to the game system 1 are present, the server 200 and the terminal apparatus 100 of the game system 1 perform various types of processing to support the multi-play function.

The server processing unit 212 is configured to perform various types of determination processing according to the progress of the game. The server processing unit 212 performs arithmetic processing required to provide the game. The server processing unit 212 performs the arithmetic processing described in the game program 221 in response to a request from the terminal apparatus 100 or the like.

For example, the server processing unit 212 instructs the data management unit 213 to add, update, or delete a record of the game information 222 or the user information 223. For example, the server processing unit 212 instructs the transmission and reception unit 211 to transmit various types of data or programs. For example, when the server processing unit 212 receives the synchronization request to support the multi-play function and the data for synchronization from the terminal apparatus 100 via the transmission and reception unit 211, the server processing unit 212 instructs a synchronization processing unit 214 to perform synchronization processing to support the multi-play function.

The data management unit 213 is configured to manage the various types of data stored in the storage unit 220 according to an instruction of the server processing unit 212. For example, the data management unit 213 adds, updates, or deletes the record of the game information 222 or the user information 223 according to an instruction from the server processing unit 212.

For example, the data management unit 213 reads at least one of the game information 222 or the user information 223 from the storage unit 220 according to an instruction from the server processing unit 212, and transmits the information to the terminal apparatus 100 via the transmission and reception unit 211.

For example, the data management unit 213 reads, from the storage unit 220, a program to be executed on the terminal apparatus 100 side among the game programs 221 according to an instruction from the server processing unit 212, and transmits the read program to the terminal apparatus 100 via the transmission and reception unit 211.

The synchronization processing unit 214 is configured to perform synchronization processing to support the multi-play function of the game according to an instruction of the server processing unit 212. The synchronization processing unit 214 performs synchronization among the terminal apparatuses by transmitting some information received from the terminal apparatus 100 corresponding to each of the accounts to another terminal apparatus 100. Also when some information is to be transmitted to the plurality of terminal apparatuses 100 from the server 200, the synchronization processing unit 214 transmits the information in synchronism with each of the terminal apparatuses 100. Note that the synchronization processing unit 214 may receive synchronization timing, information to be synchronized, or the like from the server processing unit 212. With this configuration, for example, an action in the game which is caused by an input operation performed in one terminal apparatus 100 is synchronized and presented in another terminal apparatus 100.

Although not illustrated in the drawing, the control unit 210 includes, for example, a distance determination unit, a grant determination unit, a game medium grant unit, and the like as an additional component. The distance determination unit is configured to determine a movement distance in a real world of the terminal apparatus 100. For example, the distance determination unit has a function of determining (identifying) a movement distance in the real world of the terminal apparatus 100 based on location information of the terminal apparatus 100. The determined (identified) movement distance is transmitted to the terminal apparatus 100 via the transmission and reception unit 211. In addition, the distance determination unit may have a function of determining (identifying) a moving speed of the terminal apparatus 100. Note that the determination of the movement distance and the moving speed may be performed on the terminal apparatus 100 side.

The grant determination unit has a function of determining whether a right to acquire a game medium is to be granted to the user based on processing information by a game progress processing unit 111 from the terminal apparatus 100. For example, the grant determination unit is configured to determine whether the right is to be granted to the user based on information after the determination processing by the game progress processing unit 111 which has been transmitted from the terminal apparatus 100.

The game medium grant unit has a function of granting the game medium to the user according to the movement distance in the real world of the terminal apparatus 100. The transmission and reception unit 211 has a function of transmitting, to the terminal apparatus 100, information related to the game medium that can be granted to the user. The game medium grant unit has a function of enabling the grant of the game medium to the user based on the movement distance in the real world of the terminal apparatus 100, the case where the grant determination unit determines that the right is to be granted to the user, or the like.

Functional configuration of terminal apparatus 100

Figure 3:
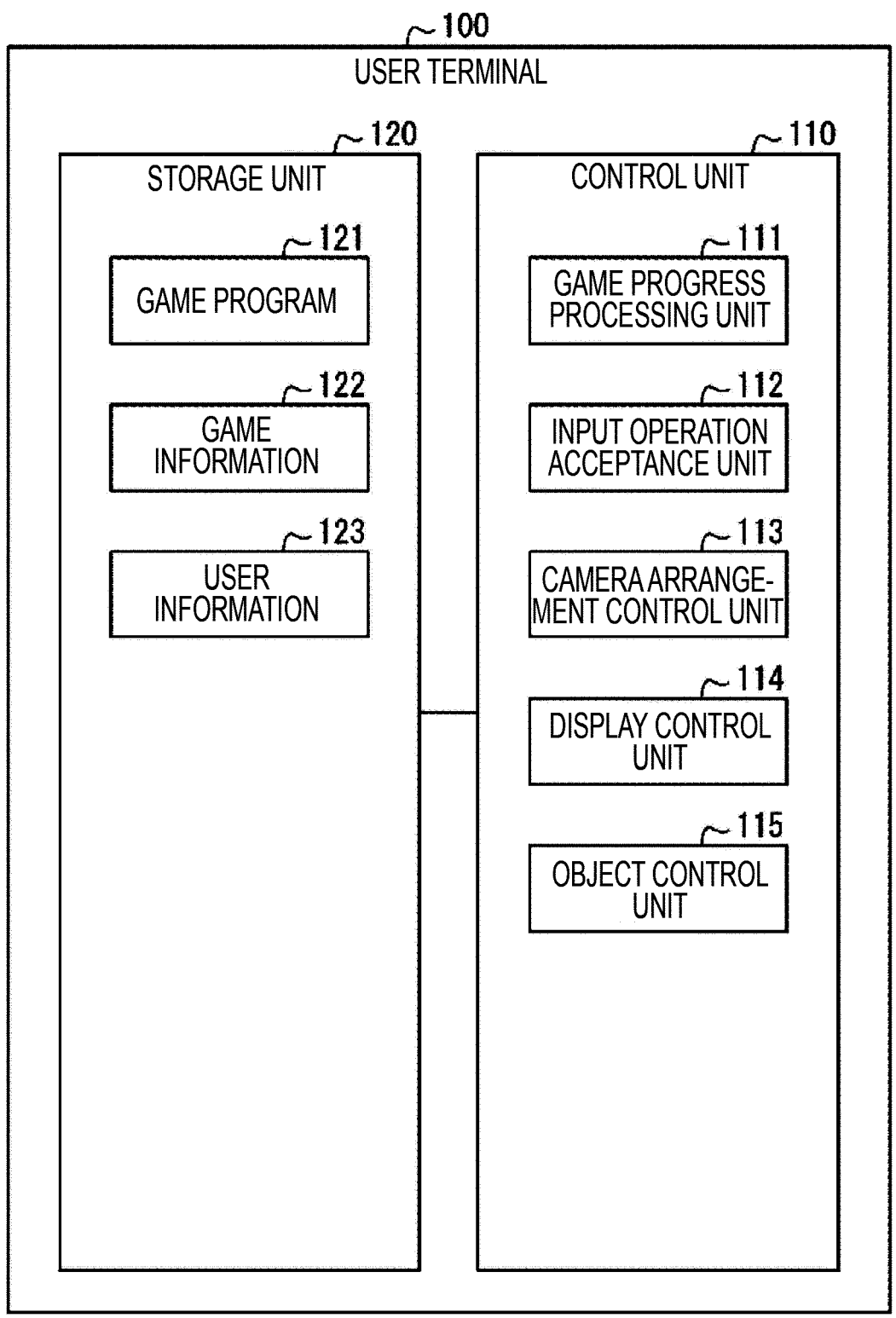
FIG. 3 is a block diagram illustrating a functional configuration of a terminal apparatus.

FIG. 3 is a block diagram illustrating a functional configuration of the terminal apparatus 100. The terminal apparatus 100 has a function as an input apparatus configured to accept the input operation by the user and a function as an output apparatus configured to output an image and voice of the game. The terminal apparatus 100 functions as a control unit 110 and a storage unit 120 in cooperation with the processor 10, the memory 11, the storage 12, the communication IF 13, the input and output IF 14, and the like.

The communication IF 13 transmits the identified location information of the real world to the server 200 using information from a global positioning system (GPS) sensor, a wireless network system, or the like included in the terminal apparatus 100.

The storage unit 120 stores the game program 121, game information 122, and user information 123. The game program 121 is a game program to be executed on the terminal apparatus 100 side. The game information 122 is data to be referred to when the control unit 110 executes the game program 121, and includes information similar to the game information 222 of the server 200. The user information 123 is data related to an account of the user of the terminal apparatus 100, and includes information similar to the user information 223 of the server 200.

The control unit 110 is configured to control the terminal apparatus 100 in an overall manner by executing the game program 121 stored in the storage unit 120. For example, the control unit 110 refers to information for defining the game space which is stored in the game information 122 to define the game space. The control unit 110 transmits and receives various types of data. For example, the control unit 110 receives various types of data, programs, data for synchronization to support the multi-play function, and the like from the server 200. For example, the control unit 110 transmits a part or all of the game information 122 or the user information 123 or a synchronization request to support the multi-play function to the server 200.

The control unit 110 functions as the game progress processing unit 111, an input operation acceptance unit 112, a camera arrangement control unit 113, a display control unit 114, and an object control unit 115 according to a description of the game program 121.

The input operation acceptance unit 112 is configured to sense and accept the input operation by the user on the input unit 151. The input operation acceptance unit 112 discriminates what kind of input operation has been performed from an action caused by the user on the console via the display unit 15 and another input and output IF 14, and outputs a result thereof to each of the elements of the control unit 110.

For example, when the input operation on the input unit 151 has been performed, the input operation acceptance unit 112 senses coordinates of an input location and a type of the operation. For example, the input operation acceptance unit 112 senses the touch operation, the slide operation, the swipe operation, the tap operation, and the like. When the input that has been continuously sensed is interrupted, the input operation acceptance unit 112 senses that the contact input from the display unit 15 has been cancelled.

The game progress processing unit 111 is configured to perform various types of processing according to the progress of the game. For example, the game progress processing unit 111 interprets an instruction content of the user which is indicated from coordinates of the input location and a type of the operation of the input operation which has been accepted by the input operation acceptance unit 112. For example, the game progress processing unit 111 adds, updates, or deletes the game information 122 or the user information 123. For example, the game progress processing unit 111 performs various types of determination processing according to the progress of the game.

The camera arrangement control unit 113 is configured to define a virtual camera for specifying a region, in the game space, to be presented to the user. The camera arrangement control unit 113 virtually arranges the virtual camera in the game space by defining a location and an orientation of the virtual camera in the game space. Furthermore, the camera arrangement control unit 113 instructs the display control unit 114 to create an image in which a viewing area defined by the virtual camera and an object arranged in the viewing area are depicted.

Note that the camera arrangement control unit 113 may appropriately decide the location and the orientation of the virtual camera for each of the game spaces. For example, the camera arrangement control unit 113 may arrange, while a location and an orientation of a specific object are set as references, the virtual camera in a predetermined direction, distance, and angle from the object such that the object is captured in a center of the viewing area in a specific orientation. The specific object may be, for example, an object of an operation character in the terminal apparatus 100, may be a dynamic object indicating another character such as a non player character, or may be a static object indicating a building, a tree, a stone, or the like. Herein, the dynamic object in the game space includes a character operating based on the game programs 121 and 221 (for example, a non player character, an enemy character, or the like), and an operation character operating based on an operation by the user.

The display control unit 114 is configured to cause the display unit 152 to display an image. For example, the display control unit 114 generates an image in which a region, in the game space, of a field of view of the virtual camera which is defined by the camera arrangement control unit 113 and an object present in the region are depicted, and causes the display unit 152 to display the image. Furthermore, the display control unit 114 may depict, on such an image, an object according to a user interface (UI) required for various operations of the game such as an icon, a button, a menu indicating various types of parameters, and the like in a superimposed manner.

The object control unit 115 is configured to arrange an object in the game space based on setting information of the object included in the game information 122. The object control unit 115 controls the object arranged in the game space. For example, the object control unit 115 changes a location, an orientation, a shape, a color, or the like of the object in the game space, or causes the object to perform a series of predetermined operations.

Note that the game system 1 may be configured such that the server 200 includes at least some of the functions included in the terminal apparatus 100. The game system 1 may be configured such that the terminal apparatus 100 includes at least some of the functions included in the server 200. Furthermore, another apparatus other than the terminal apparatus 100 and the server 200 may be set as a component of the game system 1, and the hardware may be caused to perform a part of the processings in the game system 1. That is, in the present embodiment, a computer configured to execute the game programs 121 and 221 may be any of the terminal apparatus 100, the server 200, and another apparatus.

Game Outline

A game to be performed by the game system 1 according to the present embodiment (hereinafter, referred to as a present game) includes a location-based game and another game different from the location-based game (for example, a battle game or the like). The present game is configured to increase an advantage degree of the user in the present game by using a game medium or the like granted as a reward by the location-based game in the location-based game or another game.

In the location-based game of the present embodiment, the user possessing the terminal apparatus can acquire a game medium according to the movement distance irrespective of whether it is a short distance or a long distance. However, in the location-based game, by accomplishing a long distance movement which may be hesitated by the user since it takes a significant time period to reach on foot, it is possible to grant, to the user, a game medium with a higher advantage degree (in-game value) of the user as compared with a case where a short distance movement is accomplished. With this configuration, it is possible to improve a motivation of the user towards moving a long distance for the progress of the game.

In addition, in the location-based game of the present embodiment, a plurality of types of modes according to the moving means are provided, and a specific mode is also provided for allowing the user themselves to use moving means to make a progress of the location-based game. When the specific mode is set according to the operation of the user, even in a case where a movement is made by the car or the like, an entire movement distance by the movement is reflected on an outcome of the game. In addition, when the specific mode is set, a configuration is adopted where the progress of the game is enabled without requiring an operation of the user. Furthermore, when the specific mode is set, a configuration is adopted where the information that should be announced to the user according to the progress of the game or the like is announced using an output unit (specifically, a speaker) other than the display unit. With this configuration, during the specific mode in the present game, the user is not required to check the game screen. As a result, even when the location-based game is performed using the moving means such as the car, looking-aside can be prevented, and it is possible to prevent a decrease in safety. Even in a case where the long distance movement is made using predetermined moving means, when the specific mode using the car or the like to be driven by the user themselves is set to make the progress of the location-based game, a game medium or the like (for example, a character, an object, and an item with a high rarity, and also a request form or the like) is granted with a higher advantage degree for the user as compared with a case where the progress of the location-based game is made by setting another mode using moving means other than the car. Therefore, it is possible to improve the motivation of the user towards the progress of the location-based game by setting the specific mode.

The "predetermined moving means" refers to a vehicle, and includes, for example, a train, an airplane, a ship, or the like in addition to a bicycle or a car driven by the user themselves, but is not particularly limited to this as long as the predetermined moving means can move at a speed higher than a walking speed of a person. An "increase in the advantage degree" includes, other than the game medium described above, an in-game virtual currency, acquisition of special in-game moving means such as an airship or a balloon, grant of a game medium such as an experience value for increasing a level of a character or an object, meeting of a condition for proceeding to a special stage or event (enabling a play) or the like, but is not particularly limited as long as the progress of the game can be made more advantageously.

On the other hand, examples of another game other than the location-based game include a battle game or the like. The battle game includes, for example, a game in which an operation character (hereinafter, a player character (PC)) to be operated by the user and a non player character operating according to a game program are caused to appear in a virtual space, and a battle between the player character and the non player character is caused to be carried out, and also the player character is caused to grow up to cause a game story to progress. Note that a battle opponent is not limited to a non player character, but also may be a player character operated by another user.

Each of the location-based game and another game such as the battle game is a game of a different type. However, the game medium granted in the location-based game (for example, the character, the object, or the item with a high rarity, and also the request form or the like) has an effect that the game medium can be used to make not only the location-based game but also the battle game which is an example of another game advantageous, or that it enables participation in a new event. Making the battle game advantageous includes, for example, a state in which the battle can be advantageously developed by using an object (such as a character or arms) with a high rarity, or the like to enable the battle game. Enabling participation in the new event includes, for example, by using a request form, enabling participation in a special quest and enabling to start a game for battling against a new enemy in the quest, or the like.

Thus, for example, in addition to a game cycle in which a reward such as a game medium is acquired by moving on foot in the location-based game the progress of the game is advantageously made in the battle game moving on foot again, while the safety is guaranteed, a new game cycle can be provided to the user in which a game medium or the like with a high rarity is acquired by moving a long distance using predetermined moving means in the location-based game the progress of the game is advantageously made by causing an object acquired in the battle game to participate in a combat a long distance movement is further made using the predetermined moving means again in the location-based game for the object to grow up the progress of the game is further more advantageously made in the battle game, and so on. Hereinafter, each of the location-based game and the battle game will be described in detail.

Location-Based Game

Figure 4A:
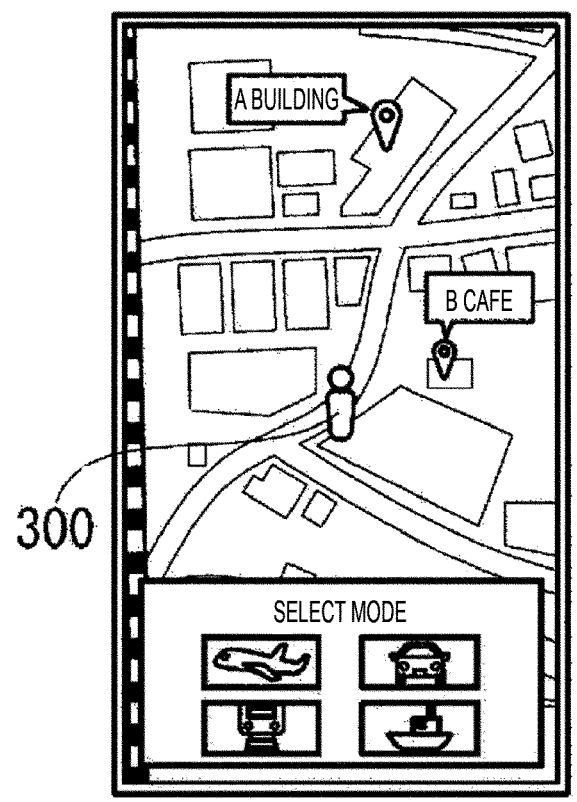
FIG. 4A illustrates an example of a display screen to be displayed on a display unit during a location-based game.

First, the location-based game will be described. FIG. 4A illustrates an example of the display unit 15 when the location-based game is started by an input operation by the user. When the location-based game is started, the terminal apparatus 100 is configured to use information from a location registration system, a GPS module of the terminal apparatus 100, or the like to identify current location information of the terminal apparatus 100 (for example, address information, latitude and longitude information, or the like), and display a map in the vicinity of the current location in the reality space of the terminal apparatus 100 (or the user possessing the terminal apparatus) based on the current location information. When the map is to be displayed, for example, by transmitting the current location information to the server 200, a transfer of map data in the vicinity of the current location is requested. The server 200 is configured to acquire the map data in the vicinity of the terminal apparatus 100 via a network from another service provision apparatus (server) configured to provide the map data, and transmit the map data in the vicinity of the terminal apparatus 100 to the terminal apparatus 100. The terminal apparatus 100 displays a map image based on the map data on the display unit 15.

In addition, a first object 300 indicating a location of the user possessing the terminal apparatus 100 and a map image of a specific range in the vicinity of the user (range that can be displayed on the display unit 15) are displayed on the display unit 15. Furthermore, map information such as a building, a roadway, or a route in the specific range is also displayed on the display unit 15.

In addition, when the location-based game is started, a mode selection user interface (UI) for selecting moving means is displayed in a lower region of the display unit 15. Icons of an airplane, a car, a train, and a ship are exemplified as the moving means in the mode selection UI. The user selects moving means to be used for the progress of the location-based game by performing a touch operation on any of the displayed icons. Note that to facilitate the selection of the moving means, in the mode selection UI, the moving means is displayed in the form of an icon of a vehicle, but the display method is not particularly limited. For example, the moving means may be displayed in the form of a text indicating a name of the moving means. In FIG. 4A, when any of the moving means is selected, shifting to (setting of) a mode corresponding to the moving means is carried out. After the mode is set, background music (BGM) according to the mode is output from the terminal apparatus 100. The BGM is set according to the mode, but the BGM to be output may be allowed to be changed by an operation of the user. In a case where a predetermined time period has elapsed without the selection of any moving means (icon) by the user, a case where the movement has actually started (when the movement of the terminal apparatus 100 is determined), or the like, the mode is shifted to a walking mode as will be described below. An effect of the shifting to the walking mode when the predetermined time period has elapsed or when the movement has actually started may be displayed in the form of a message in the mode selection UI.

Figure 4B:
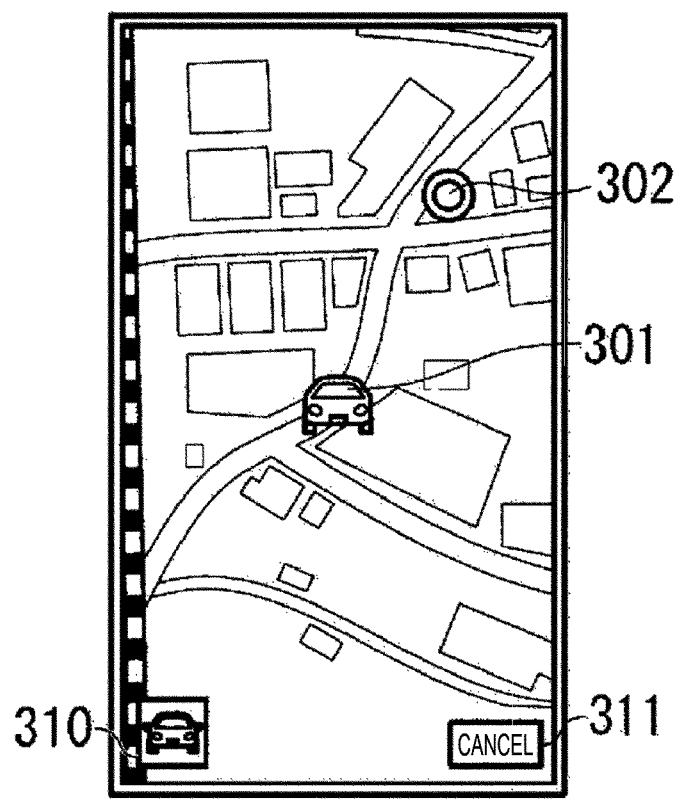
FIG. 4B illustrates an example of a display screen to be displayed on a display unit during a location-based game.

FIG. 4B illustrates an example of the display unit 15 when a car is selected as the moving means. When the car is selected as the moving means, the mode is shifted to a drive mode (hereinafter, also referred to as a specific mode). When the mode is shifted to the drive mode, the first object 300 of the user which had been displayed on the display unit 15 is changed to a second object 301 shaped like a car. For the second object 301, for example, a vehicle or the like to be used in the battle game of the present game may be displayed as the second object 301 on the display unit 15.

In addition, an icon 310 (in FIG. 4B, a car) indicating a currently performed mode is displayed in a lower left region of the screen of the display unit 15, and an icon 311 for cancelling the current mode (in FIG. 4B, the drive mode) is displayed in a lower right region of the screen. The user can visually confirm the currently performed mode (in FIG. 4B, the drive mode) by the icon 310. In addition, the user may be allowed to reselect the mode (moving means) by an input operation of the icon 310. In addition, the user can suspend or end the currently performed mode (in FIG. 4B, the drive mode) by performing an input operation of the icon 311. The operation to suspend or end the mode will be described with reference to FIG. 4F.

In addition, during the drive mode, information that should be announced to the user can be switched from announcement using an image on the display unit 15 to announcement based on sound from the speaker. That is, the information that should be announced to the user according to the progress of the game along the game progress processing from the terminal apparatus 100 is announced to the user by the sound from the speaker instead of the display on the display unit 15 during the drive mode. Although the second object 301 and the map image according to the location of the object are displayed on the display unit 15, the information that should be announced to the user according to the progress of the game or the like is announced by the sound from the speaker.

Examples of the information that should be announced according to the progress of the game or the like include, for example, grant of a right according to the movement distance during the drive mode, collection of an item arranged within a predetermined range, passing-by of another user, location of a landmark being within a predetermined range, or the like. Thus, the user is not required to check the display screen of the terminal apparatus 100 during the drive mode, and it is possible to find out information on the progress of the game by the sound from the speaker. As a result, looking-aside is prevented even in the movement by moving means such as the car, and the safety of the user during the movement is improved. Note that during a mode corresponding to moving means other than the car (moving means that is not driven by the user themselves such as a train), the information that should be announced to the user is announced not only by the announcement based on the sound from the speaker but also by announcement using an image on the display unit 15 (image corresponding to the information that should be announced).

FIG. 4B illustrates an example, as a display example of the display unit 15 during the drive mode, in which only the images such as the second object 301 and the map image are displayed on the display unit 15, but the image corresponding to the information that should be announced to the user according to the progress of the game or the like is not displayed. Note that the images such as the second object 301 and the map image are images to be displayed according to the progress of the game, but are not the information that should be announced to the user since those images are not necessarily required information (game progress information) for the user. However, a configuration is not limited to this as long as the image corresponding to the information that should be announced to the user according to the progress of the game or the like is not displayed on the display unit 15 during the drive mode. A configuration may be adopted where the images such as the second object 301 and the map image are also not displayed on the display unit 15 during the drive mode. In this case, for example, a specific image (such as a predetermined still image or moving image) that is not associated with the progress of the game, a standby image prepared in advance in the game, an image of an icon 301, an image possessed by the user, or the like may be displayed, and a configuration may also be adopted where no image is displayed (black screen or the like). Note that a configuration may be adopted where the icon 311 is always displayed on the display unit 15 during the drive mode, or the icon 311 may be displayed by a touch operation on the touch panel.

In addition, when another terminal apparatus playing the present game is present within a specific range displayed on the display unit 15, as illustrated in FIG. 4B, a third object 302 is displayed at a location corresponding to the other terminal apparatus (location of the terminal apparatus, or any location within a predetermined range (20 m) from the location of the terminal apparatus). The third object 302 may be displayed as a vehicle or the like to be used in the present game similarly as in the second object 301. Note that the third object 302 is an image to be displayed according to the progress of the game, but is not the information that should be announced to the user since the image is not information (game progress information) that is necessarily required for the user. However, a configuration may be adopted where the information such as the third object 302 is also not displayed on the display unit 15 during the drive mode as will be described below.

Figure 4C:
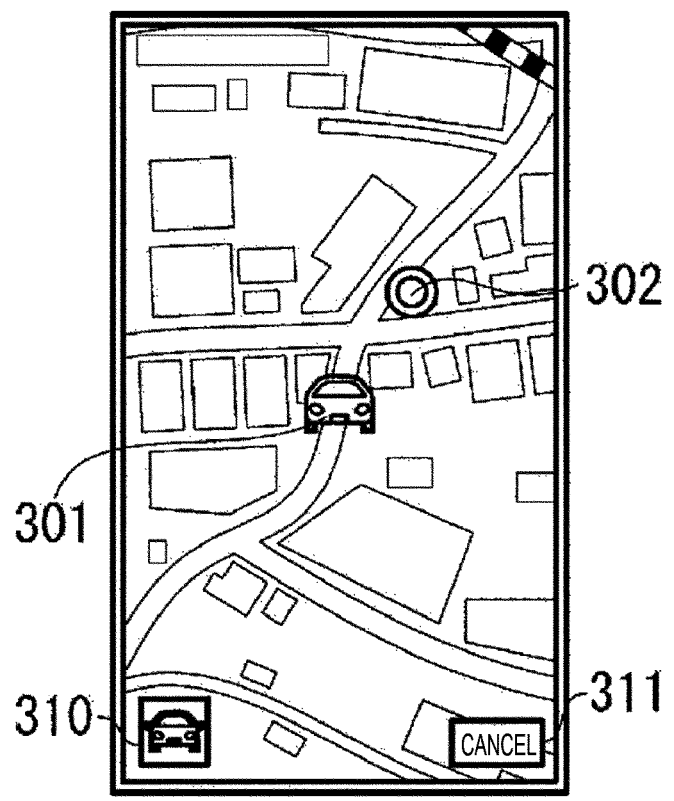
FIG. 4C illustrates an example of a display screen to be displayed on a display unit during a location-based game.

FIG. 4C illustrates an example of the display unit 15 when the user possessing the terminal apparatus 100 moves during the drive mode. The terminal apparatus 100 transmits current location information to the server 200 as needed during the location-based game and acquires map data in the vicinity of the terminal apparatus 100 to update and display the map image serving as a background of the second object 301. With this configuration, when the user moves, the map image serving as the background is updated according to the movement. Since the user has made the movement, when another user is located within a predetermined range (for example, 50 m) which is narrower than a specific range (for example, FIG. 4C), a voice "Hey" is output from a speaker of the terminal apparatus 100. With this configuration, when passing by the third object 302 corresponding to another user, the user can be provided with a simulated experience as if being greeted by the other user even without visually checking the display unit 15, and it is possible to improve attractiveness of the game.

Figure 4D:
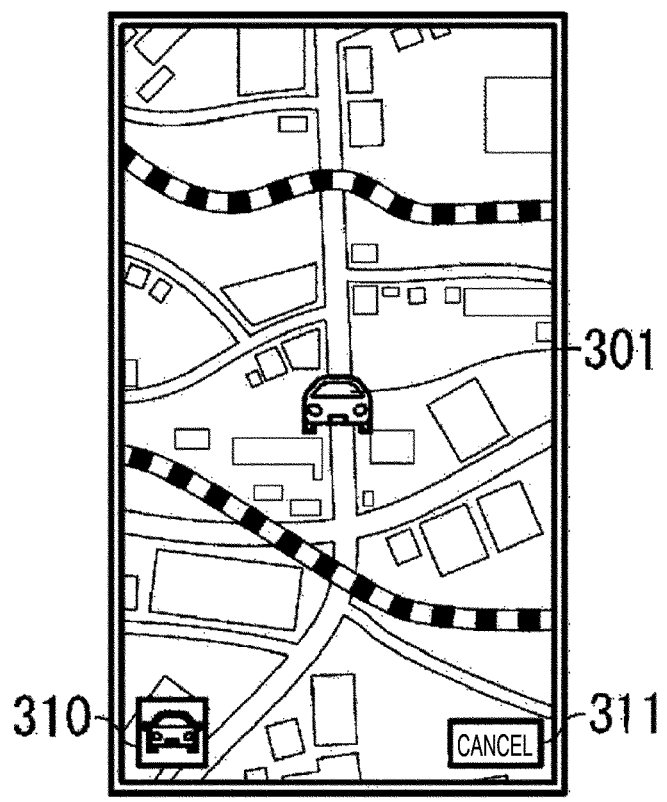
FIG. 4D illustrates an example of a display screen to be displayed on a display unit during a location-based game.

FIG. 4D illustrates an example of the display unit 15 when a right for acquiring a game medium is granted to the user by a predetermined condition being satisfied during the drive mode. During the drive mode, information (example of the game progress information) indicating that the predetermined condition is satisfied and the right is granted is announced to the user by sound being output from the speaker without display (announcement) on the display unit 15. For example, the predetermined condition is satisfied when the movement distance during the drive mode reaches a predetermined distance. When the predetermined condition is satisfied, for example, a voice "Reached 10 km in the drive mode. Acquired a material." is output from the speaker. In addition, when a previously set landmark is located within a predetermined range (for example, within a 50 m radius), a voice "Reached the landmark!", for example, is output from the speaker. In this manner, the announcement is made to the user when the sound with which the game progress information is identifiable is output from the speaker. On the other hand, as illustrated in FIG. 4D, since the second object 301, the map image, and the like are merely displayed on the display unit 15, a motive for the user to look at the display unit 15 is not generated.

Note that the predetermined condition is not limited to the exemplified conditions, and the predetermined condition may be satisfied in a state in which the time period for the movement using the predetermined moving means reaches a predetermined time period, a specific place (location) is passed, a game medium is picked up by moving near the game medium randomly arranged on the map, some non player characters are defeated by combating the non player characters by moving near the non player characters randomly arranged on the map, or the like.

Figure 4E:
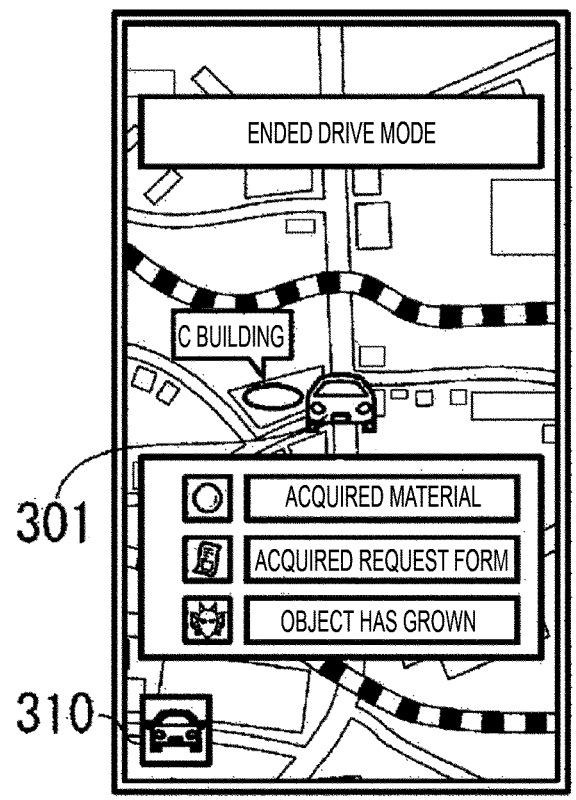
FIG. 4E illustrates an example of a display screen to be displayed on a display unit during a location-based game.

FIG. 4E illustrates an example of the display unit 15 when the drive mode is ended. The user can end the location-based game by cancelling the current mode by an input operation on the icon 311. When the mode is ended, as illustrated in FIG. 4E, the icon 311 is not displayed, and a reward based on a result of the movement, that is, a game medium or the like to be granted to the user is displayed on the display unit 15. The game medium to be granted is decided according to a type of the mode, the movement distance, a right granted during the mode, or the like. When the predetermined moving means is used, the movement distance per time period becomes longer as compared with a case when the movement is carried out on foot. As a result, a value of the game medium granted to the user per unit time period becomes higher as compared with a case where the predetermined moving means is not used. In addition, even in a case where the predetermined moving means is used, when the drive mode is set, the game medium or the like with a high advantage degree of the user is granted as compared with a case where the other mode is set. Since the mode is ended to grant a game medium, the game medium is granted to the user, and its usage or the like is enabled.

FIG. 4F is a table for describing a name of the granted game medium and an example of an effect exerted by the game medium in the game. For example, a material has an effect of enhancing arms or the like equipped by the player character. It is facilitated for the user to defeat the non player character by enhancing the weapon or the like, and the progress of the game can be made advantageously. In addition, a request form has an effect that enables participation in a special quest that is not associated with the progress of the game is allowed, for example. By participating in this quest, the user can obtain an object or a special weapon that allows participation in the combat, or encounter a new non player character. Furthermore, there is an effect of causing the obtained object to grow. As the object, an entity other than a person such as a dragon or a snake may be adopted, or an entity with a shape of a robot or a person may be adopted. When this object grows, a status such as offensive power is increased, or a new skill is learnt. As a result, the player character can advantageously make the progress in the combat or the like against the non player character by causing the object to participate in the combat. Note that the material, although the request form, and the like are exemplified as the game medium, the game medium may be an in-game virtual currency, an experience value, or the like, for example, and also may be an item for offering a premium of the movement distance during the mode (for example, doubling the movement distance, or the like). The game medium is not particularly limited to these as long as the game medium can make the game progress advantageous in the location-based game or another game (for example, a battle game)

Battle Game

Next, a battle game corresponding to an example of another game will be described. The battle game is a game for causing the player character to battle against the non player character as described above. In the battle game, for example, the game may make the progress when the player character defeats the non player character. To defeat the non player character, the user enhances the player character. The enhancement of the player character is performed, for example, by increasing a level of the player character, enhancing a weapon, a protective guard, or the like equipped by the character player, or obtaining an object to participate in a battle together with the player character.

In addition, a configuration may also be adopted where the weapon or the like equipped by the player character can be enhanced by an item (material or the like) that can be obtained in the game. In addition, a characteristic of the weapon or the like may vary according to a characteristic of the material to be used in the enhancement. For example, examples of such a case include a case where, when the material to be used in the enhancement has a fire attribute, the fire attribute is applied to the enhanced weapon.

In addition, a plurality of quests (stages) are prepared in the battle game, and the user can clear the quest by meeting a requirement associated with each of the quests. Examples of the requirement include those that are satisfied by defeating all of the appearing non player characters, defeating a boss character among the appearing non player characters, reaching a predetermined location, or the like, for example.

For example, the quest may be performed by the progress of the game, or a special quest corresponding to obtainment of the request form or the like may be performed. In addition, a configuration may be adopted where the quest can be cleared in cooperation with another user.

In addition, an object that is to combat the non player character together with the player character may be present. A configuration may be adopted where this object can be operated similarly as in the player character or may be adopted where this object can participate only in an attack in the combat. This object may grow under a same condition with the player character, or may grow by meeting a condition different from that of the player character. A configuration may be adopted where this object can be obtained by the progress of the game or can be obtained by the request form.

Some of the obtainment of the above described material, the request form, or the like and the obtainment and growth of the object may become available by the user using the predetermined moving means in the location-based game, and in addition, may become available only when the drive mode is set among modes using the predetermined moving means.

Location-Based Game Associated Processing

Figure 5:
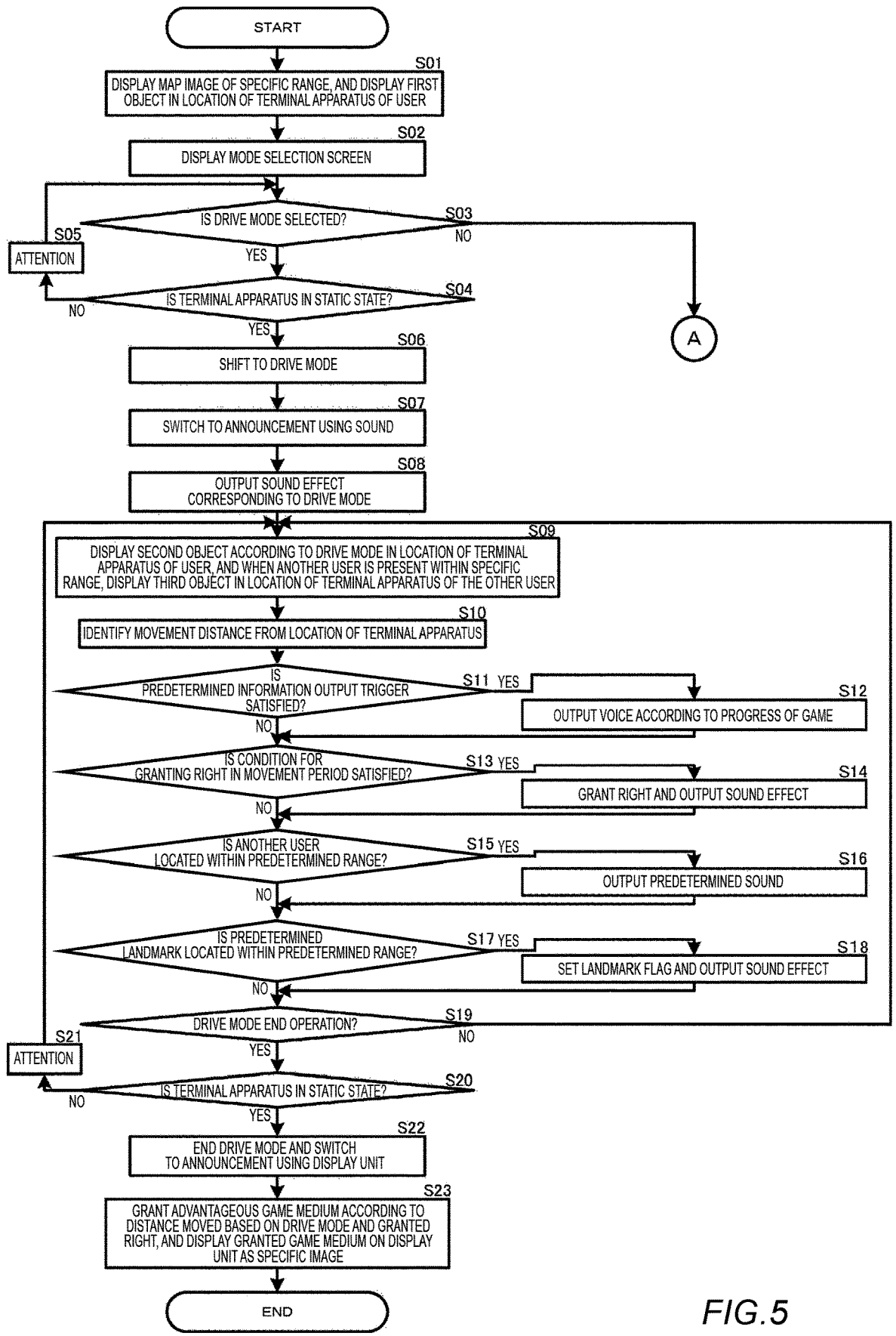
FIG. 5 is a diagram for describing a flowchart of location-based game associated processing.
Figure 6:
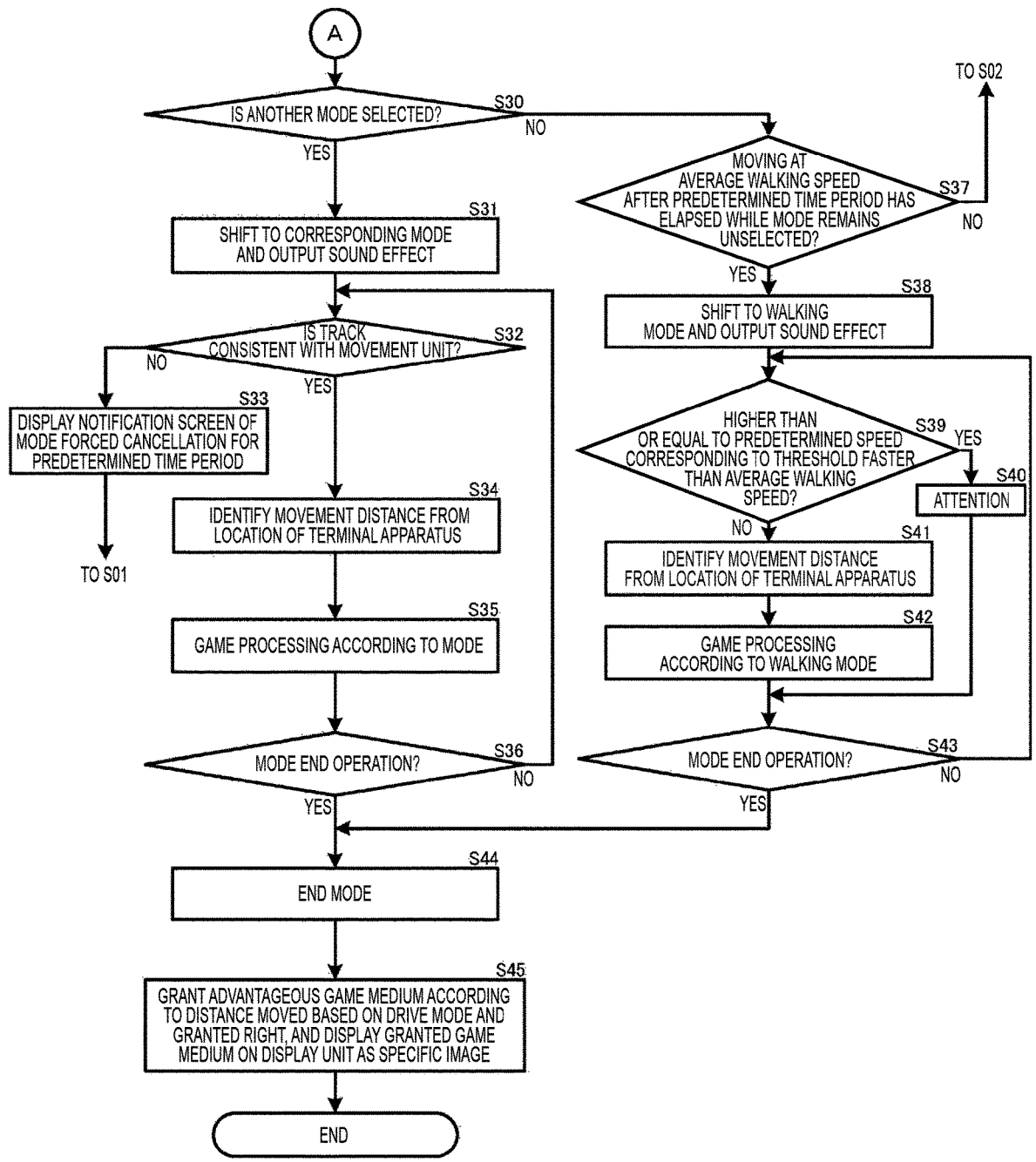
FIG. 6 is a diagram for describing a flowchart of the location-based game associated processing.

FIG. 5 is a flowchart illustrating an example of location-based game associated processing to be performed by the terminal apparatus 100. The location-based game associated processing is performed by the terminal apparatus 100 during the location-based game, but the configuration is not limited to this, and a part of the processing may be performed in the server 200, and a processing result may be transmitted to the terminal apparatus 100.

When the location-based game is started, in step S01, the map image, the location of the terminal apparatus 100, or the like is displayed on the display unit 15 based on the location information acquired by the terminal apparatus 100, or the like. On the display unit 15, the first object 300 is displayed at the location of the terminal apparatus 100 of the user, and the map image of a specific range in the vicinity of the user is displayed (see FIG. 4A). At this time, general map information such as a nearby building, a roadway, or a route is also displayed in the map image of the specific range. In addition, in step S02, the mode selection UI for selecting the moving means to be used is displayed in the lower region of the display unit 15 (see FIG. 4A). The mode is shifted to a mode corresponding to the moving means by selection through the touch operation of the displayed moving means or the like.

In step S03, it is determined whether the drive mode is selected. The drive mode is a mode when the user selects a car as the moving means. When it is determined that the drive mode is selected, the flow proceeds to step S04. On the other hand, when it is not determined that the drive mode is selected, the flow proceeds to step S30.

In step S04, it is determined whether the location of the terminal apparatus 100 is in a static state. The game progress processing unit 111 determines whether the location of the terminal apparatus 100 is in the static state based on the movement distance of the terminal apparatus 100 within a predetermined period of time or the like. The "static state" refers to a state in which a probability that the user remains in a predetermined place without movement is high. The static state may include not only a state in which it is determined that the terminal apparatus 100 is not moving based on information from a GPS sensor included in the terminal apparatus 100, for example, but also a state in which even when it is determined that the terminal apparatus is moving, the moving range is within a predetermined range and it is regarded that the user themselves is not moving and the motion is within a range of body and hand gestures of the user. With regard to the determination of the static state, for example, a determination is made on whether a distance between the location when it is determined that the drive mode is selected for the location of the terminal apparatus 100 and the location at a time preceding the determination by a predetermined period of time (for example, 0.5 seconds, 1 second, or the like) is a predetermined distance or less. When the distance is the predetermined distance or less, it is determined that the terminal apparatus 100 is in the static state, and when the distance exceeds the predetermined distance, it is determined that the location of the terminal apparatus 100 is not in the static state. The "predetermined distance" refers to a distance in which the movement distance of the location of the terminal apparatus 100 in the predetermined period of time is within a range from 0 to 1 m (range of the body and hand gestures of the user), for example.

When it is not determined in step S04 that the location of the terminal apparatus 100 is in the static state, the input operation from the user is not accepted as valid, and the flow proceeds to step S05 to call attention of the user, and shifts to step S03 again. As a method of calling attention, an attention content (for example, a message "Stop and select!") may be displayed on the display unit 15, or sound (including a voice "Stop and select!") for calling attention may be output. With this configuration, when the location is not in the static state, without shifting to the drive mode, it is possible to urge for stopping and performing an operation again.

On the other hand, when it is determined that the location of the terminal apparatus 100 is in the static state, the flow proceeds to step S06. In step S06, the mode is shifted to the drive mode. In this manner, by shifting the mode to the drive mode through the processing of S03 and S04, for example, even when an input operation for shifting the mode to the drive mode has been already performed while using the car or the like to move, the mode is not shifted to the drive mode and the input operation is wasted, so that the input operation for shifting to and starting the drive mode during the movement can be suppressed and prevented. Note that as will be described below, when an operation for selecting a mode corresponding to moving means other than the moving means driven by the user themselves such as a car (such as a train or an airplane) is performed, since the processing corresponding to step S04 is not performed as will be described below, the mode can be shifted to the selected mode even during the movement.

In step S07, the mode is switched from the mode for announcing the information that should be announced to the user using the display unit 15 to the mode for announcing the information using the speaker (sound). In addition, during the drive mode, as will be described below, the progress of the game can be made by only moving the terminal apparatus 100 without requiring an input operation from the user. Thus, during the drive mode, the user can recognize the progress of the game by sense of hearing without looking at the display unit 15.

As illustrated in FIG. 4B or the like, the map image with which the current location is identifiable is displayed as the predetermined image on the display unit 15. However, during the drive mode, the announcement mode to the user is switched to the announcement mode using only the sound in step S07, and information affecting the progress of the game, the result, or the like is not to be displayed on the display unit 15. Thus, it is possible to reduce a chance that the user pays attention to the display unit 15 during the drive mode, and the safety of the user can be improved.

In step S08, a sound effect corresponding to the drive mode is caused to be output from the speaker of the terminal apparatus 100. Examples of the sound effect include, for example, BGM. By listening to the BGM corresponding to the drive mode, the user can enjoy the movement by driving without looking at the display unit 15.

In step S09, the map image with which the current location during the drive mode is identifiable based on the location information acquired from the terminal apparatus 100 is displayed on the display unit 15. During the drive mode, as illustrated in FIG. 4B, the second object 301 is displayed in a superimposed manner on the map image according to the current location of the terminal apparatus 100 that the user has. In addition, during the drive mode, when a terminal apparatus possessed by another user is present within a specific range, the third object 302 is displayed at a location corresponding to the terminal apparatus possessed by the other user (see FIG. 4B). Note that the processing in step S09 is repeatedly performed according to the locations of the terminal apparatus 100 possessed by the user and the other terminal apparatus, and a display state of the display unit 15 is updated.

In step S10, the movement distance of the terminal apparatus 100 is identified from the location of the terminal apparatus 100. The distance determination unit of the server 200 determines the movement distance of the terminal apparatus 100 in the real world from location information of the terminal apparatus 100 which is sequentially transmitted from the terminal apparatus 100. A determined result is sent from the transmission and reception unit 211 of the server 200 to the communication IF 13 of the terminal apparatus 100. In step S10, the movement distance of the terminal apparatus 100 is identified based on the received information.

In step S11, it is determined whether a predetermined information output trigger is satisfied. Examples of the predetermined information output trigger include, for example, when a predetermined condition is met by travelling a predetermined distance (for example, 2 km), when a specific user (for example, a user registered as a friend) or a landmark is present within a predetermined range (for example, a 2 km radius), or the like. When it is determined that the predetermined information output trigger is satisfied, the flow proceeds to step S12. On the other hand, when it is not determined that the predetermined information output trigger is satisfied, the flow proceeds to step S13.

In step S12, a voice according to the progress of the game (a voice according to the satisfied information output trigger) is output from the speaker. As the voice according to the information output trigger, for example, a voice "You will acquire a right in 2 km" when the predetermined condition is met by travelling a predetermined distance, a voice "Landmark A is located in the southeast direction!" when the landmark is present within a predetermined range, or the like is output.

In step S13, it is determined whether a predetermined condition (a condition for granting the right during the drive mode) is satisfied. The condition for granting the right is, for example, a condition to be satisfied each time the movement distance during the drive mode reaches 10 km, a condition to be satisfied by passing near an item arranged in advance on the map, or the like. When it is determined that the condition for granting the right is satisfied, the flow proceeds to step S14. On the other hand, when it is not determined that the condition for granting the right is satisfied, the flow proceeds to step S15.

In step S14, a right is granted to the user and also a sound effect for informing the user of the grant is output (see the description in FIG. 4D). By the grant of a right during the drive mode, a game medium according to the right is granted to the user when the drive mode is ended, enabling the user to use the game medium (or enabling an effect to be exerted in the game). The sound effect is output from the speaker of the terminal apparatus 100. As the sound effect, for example, a voice "Reached 10 km from the start of the drive mode. Acquired the material.", or simply, a voice such as "Got the right" or "Collected the item", or the like is output to inform the user of the grant of the right.

In step S15, it is determined whether another user (terminal apparatus of the other user) is located within a predetermined range which is narrower than the specific range based on the location information from the terminal apparatus 100. When it is determined that the other user is located within the predetermined range, the flow proceeds to step S16. On the other hand, when it is not determined that the other user is located within the predetermined range, the flow proceeds to step S17.

In step S16, a predetermined sound is output from the speaker of the terminal apparatus 100. Examples of the predetermined sound include, for example, an output of a voice corresponding to a greeting such as "Hey" (see FIG. 4D).

In step S17, it is determined whether a predetermined landmark is located within a predetermined range (for example, within a 50 m radius) based on the location information from the terminal apparatus 100. When it is determined that the predetermined landmark is located within the predetermined range, the flow proceeds to step S18. On the other hand, when it is not determined that the predetermined landmark is located within the predetermined range, the flow proceeds to step S19.

In step S18, a landmark flag is set and a sound effect is output. A voice with which it is identifiable that a landmark is located within a predetermined range is output from the speaker of the terminal apparatus 100 to be announced to the user. For example, a voice "Reached landmark A! Got ○ ○ which is this area's local item!" is output. The landmark flag is information for identifying a landmark passed nearby during the movement, and as described below, a game medium corresponding to the landmark based on the landmark flag is granted to the user when the drive mode is ended. In step S19, it is determined whether a drive mode end operation has been performed by an input operation from the user. When it is determined that the drive mode end operation has been performed, the flow proceeds to step S20. On the other hand, when it is not determined that the drive mode end operation has been performed, the flow returns to step S09.

In step S20, similarly to step S04, it is determined whether the location of the terminal apparatus 100 is in the static state. In step S20, when it is not determined that the location of the terminal apparatus 100 is in the static state, the input operation from the user is not accepted as valid, and the flow proceeds to step S21 to call attention of the user, and shifts to step S09 again. As a method of calling attention, an attention content (for example, a message "Stop and select!") may be displayed on the display unit 15, or sound ("Stop and select!") for calling attention (including a voice "Stop and select!") may be output. With this configuration, when the location is not in the static state, without ending the drive mode, it is possible to urge for stopping and performing an operation again. On the other hand, when it is determined that the location of the terminal apparatus 100 is in the static state, the flow proceeds to step S22.

In step S22, the drive mode is ended. In this manner, by ending the drive mode through the processing in S19 and S20, even when the input operation for ending the drive mode is performed to check the game medium or the like acquired during the movement using, for example, a car or the like, since the drive mode is not ended and the input operation is wasted, the input operation for ending the drive mode during the movement can be suppressed or prevented. Note that as will be described below, when the end operation is performed during the mode corresponding to moving means other than the moving means driven by the user themselves such as a car (such as a train or an airplane), since the processing corresponding to step S20 is not performed as will be described below, the selected mode can be ended even during the movement. In addition, in step S22, along with the end of the drive mode, the mode is switched from the mode for announcing the information that should be announced to the user using only the speaker (sound) to the announcement mode using the display unit 15.

In step S23, a game medium or the like is granted to the user based on the movement result. The game medium to be granted is granted to the user based on the movement distance during the drive mode, the right granted during the drive mode, or the like. Examples of the right granted during the drive mode include a right to be satisfied by moving a predetermined distance during the drive mode, a right to be satisfied by collecting an arranged item, a right to be satisfied by passing near a predetermined landmark, or the like. The game medium is granted based on these rights. The right to be granted may be, for example, a special right (for example, a local item) associated with the landmark, and when the selected mode is the drive mode, a further special right may be granted. In this manner, the motivation of the user to attempt to make the movement using the drive mode is improved. Note that the right is a medium for granting a game medium according to the right at the end of the drive mode to the user to enable the user to use the game medium (or to enable an effect to be exerted in the game).

A game medium with a high in-game value corresponding to the drive mode may be granted to the user at the end of the drive mode. This game medium with the high in-game value may be a game medium which may be obtained only in the drive mode, such as, for example, a special object or a special request form. In the present embodiment, when the movement distance is the same, the in-game value of the game medium to be granted in a case where the movement is made in the drive mode becomes the highest as compared with the other mode or the like. That is, the advantage degree can be increased to the highest when the movement is made in the drive mode. In the present embodiment, in principle, as the movement distance becomes longer, the game medium with the higher in-game value is to be granted. Note that with regard to the game medium to be granted, even when the movement distance is the same, the game medium to be granted is different according to a type of the mode such as the drive mode, the other mode, or the walking mode. In addition, also in the other mode, a game medium to be granted may be different according to a type of the moving means.

In addition, in step S23, it is not limited to a reward being granted based on the right or the like granted during the drive mode which has ended, but in addition to this, a reward is granted according to a total movement distance during the drive mode. For example, a portion of the in-game currency that can be used in the game according to the total movement distance may be granted, a game medium according to the total movement distance among game media set in a stepwise fashion such that the advantage degree is different according to the movement distance may be granted, or the like. Also in this case, the advantage degree of the reward to be granted is set to be higher as the total movement distance becomes longer, but even when the total movement distance is the same, the advantage degree may be set as follows: the drive mode>the mode corresponding to other moving means (such as the train)>the walking mode.

In addition, in step S23, a specific image is displayed on the display unit 15 (see FIG. 4E). Information such as the movement distance during the drive mode, the right granted during the movement, the game medium to be granted according to the drive mode, and the like are displayed on the specific image, for example.

The processing content from when the drive mode is set and until the drive mode is ended has been described above, and hereinafter, a processing content when the drive mode is not selected will be described. Returning to step S03, when it is not determined that the drive mode is selected, in step S30, it is determined whether another mode other than the drive mode is selected. The other mode refers to a mode corresponding to an airplane, a train, or a ship. When it is determined that any other modes are selected, the flow proceeds to step S31.

In step S31, the mode is shifted to the mode corresponding to the moving means selected by the user. In this manner, when another mode other than the drive mode is selected, since the processing corresponding to step S04 is not carried out, the mode can be shifted to the selected mode even during the movement. In addition, a sound effect corresponding to the selected mode is output from the speaker of the terminal apparatus 100. Examples of the sound effect include, for example, BGM. The user can enjoy the movement by listening to the BGM corresponding to the selected mode. Note that a map of a specific range from the location information acquired by the terminal apparatus 100 is displayed on the display unit 15, and an icon indicating the location of the terminal apparatus 100 is superimposed on the map.

In step S32, it is determined whether a track of the terminal apparatus 100 is consistent with a track of the moving means. The track of the terminal apparatus 100 is identified from the location information of the terminal apparatus 100, and it is determined whether the track of the terminal apparatus 100 is consistent with a track of the selected moving means. For example, when the train is selected as the moving means, it is determined whether the movement is made along a permanent way included in the map, and when the ship is selected as the moving means, it is determined whether the movement is made on the sea included in the map. When it is determined that the track of the terminal apparatus 100 is consistent with the track of the moving means, the flow proceeds to step S34. On the other hand, when it is not determined that the track of the terminal apparatus 100 is consistent with the track of the moving means, the flow proceeds to step S33, and a notification screen of a mode forced cancellation is displayed to the user for a predetermined time period (for example, 10 seconds or the like). A content indicating forced cancellation of the mode is displayed on the notification screen of the mode forced cancellation (for example, when the track during the mode corresponding to the train is not consistent with the permanent way, a message "Not moving on the permanent way! Please restart from the beginning." indicating that the track is not consistent with the moving means corresponding to the selected mode, and thus should be restarted). In addition, the notification of the mode forced cancellation may be performed by a voice or a warning sound. When the notification of the mode forced cancellation is issued, the flow returns to step S01, and a starting state (initial state) of the location-based game is established. Without performing a display for accepting an operation of the user or the like (without requiring an operation from the user) on the notification screen of the mode forced cancellation, the flow is forcedly returned to step S01 to establish the starting state (initial state) of the location-based game. Note that after the notification screen of the mode forced cancellation is displayed, the configuration is not limited to returning to the starting state of the location-based game, but also may be returning to a state before the start of the location-based game (for example, a main selection screen with which another game (such as a battle game) can be selected, or the like). With this configuration, it is possible to ask the user to select a game to play from the beginning, and a compulsive feeling that the user feels forced to continuously play the location-based game can be alleviated. In addition, choices for asking an intention of the user (choices such as, for example, "End the game? "Yes" or "No") may be caused to be displayed on the notification screen of the mode forced cancellation to determine whether to shift the flow to step S01 or the like or to resume the location-based game according to the select choice. In step S34, the movement distance of the terminal apparatus 100 is identified from the location of the terminal apparatus 100. The method of identifying the movement distance is similar to step S10.

In step S35, the game processing according to the mode is performed. The game processing according to the mode is, for example, processing for granting the right to the user or announcing that effect to the user when the condition for granting the right during the selected mode is satisfied, when another user is located within a predetermined range, when a landmark is located within a predetermined range, or the like. In the game processing, the information that should be announced to the user according to the progress of the game or the like is announced to the user using the image by the display unit 15 and the sound by the speaker. In addition, with regard to the progress of the game in a mode other than the drive mode, the progress is enabled by an input operation from the user. For example, in the mode other than the drive mode, when the condition for granting the right is satisfied, a query message icon "Get the right? YES" is displayed. The right is granted to the user by a touch operation on the icon "YES", and when the touch operation is not performed within a predetermined time period, the right is not granted. Thus, in the mode other than the drive mode, the progress of the game is made by accepting an operation for acquiring the right. When the train is selected as the moving means, the user can perform the input operation for the game progress while sitting in a seat. Note that even in the mode other than the drive mode, the progress of the game may be (automatically) made without requiring an input from the user.

In step S36, it is determined whether an input operation for ending the mode from the user has been performed. When it is determined that the input operation for ending the mode from the user has been performed, the flow proceeds to step S44 to end the mode as will be described below. In this manner, when the end operation of another mode other than the drive mode is performed, since the processing corresponding to step S20 is not performed, the selected mode can be ended even during the movement. On the other hand, when it is not determined that the input operation for ending the mode from the user has been performed, the flow returns to step S32. Note that since the user themselves does not drive in the mode other than the drive mode, as described in step S30, S36, or the like, the mode shifting and the mode cancellation can be performed irrespective of whether the state is in the static state (during the movement).

In step S37, it is determined, from the location information of the terminal apparatus 100, whether the user is moving at an average walking speed after a predetermined time period has elapsed while the mode remains unselected. When it is determined that the user is moving at a speed (hereinafter, also referred to as an average walking speed) within a range of the average moving speed on foot (for example, 1 km to 8 km per hour or the like) after the predetermined time period has elapsed while the mode remains unselected, the flow proceeds to step S38. On the other hand, when the predetermined time period has not elapsed or it is not determined that the user is moving at the average walking speed, the flow returns to step S02, and the mode selection is urged again. Note that the example has been illustrated in which an icon corresponding to the walking mode is not displayed in the mode selection UI (see FIG. 4A), and the walking mode is set when the predetermined time period has elapsed or when the actual movement has started, but the configuration is not limited to this, and the icon corresponding to the walking mode may be included to be displayed in the mode selection UI, and the walking mode may be selected according to an input operation from the user.

In step S38, the mode is shifted to the walking mode, and the sound effect corresponding to the walking mode is output from the speaker of the terminal apparatus 100. Examples of the sound effect include, for example, BGM. The user can enjoy the movement by listening to the BGM corresponding to the selected mode.

In step S39, it is determined, from the location information of the terminal apparatus 100, whether the average speed of the user during the walking mode is higher than or equal to a predetermined speed corresponding to a threshold faster than the average walking speed (for example, 10 km per hour). When it is not determined in step S39 that the average speed of the user during the walking mode is higher than or equal to the predetermined speed that is faster than the average walking speed, the flow proceeds to step S41. In step S41, the movement distance of the terminal apparatus 100 is identified from the location of the terminal apparatus 100. A method of identifying the movement distance is similar to that of step S10. In step S42, the game processing according to the walking mode is performed. The content of the game processing is similar to that of step S35.

On the other hand, when it is determined that the average speed during the walking mode is higher than or equal to the predetermined speed, the flow proceeds to step S40 to call attention from the user, and the flow shifts to step S43. As a method for calling attention, an attention content (for example, a message "Move on food") may be displayed on the display unit 15, or sound for calling attention (including a voice "Move on foot!" may be output. Note that the movement while it is determined that the average speed during the walking mode is higher than or equal to predetermined speed is not added as the movement on foot since the processing in the step S41, S42, or the like is not performed as a result of shifting to step S43, and the game processing according to the walking mode is also not performed.

In step S43, it is determined whether the input operation for ending the walking mode from the user has been performed. When it is determined that the input operation for ending the mode from the user has been performed, the flow proceeds to step S44. On the other hand, when it is not determined that the input operation for ending the mode from the user has been performed, the flow returns to step S39.

In step S44, the input operation for ending the mode from the user is accepted, and the mode is ended. In step S45, the game medium granted during the mode is granted to the user. The game medium to be granted is granted to the user based on the movement distance during the selected mode, the right granted during the selected mode, or the like. With regard to the movement based on the walking mode, the movement distance per time period becomes shorter as compared with that for movement in another mode (mode corresponding to the moving means). As a result, the in-game value of the game medium granted by the movement based on the walking mode is lower than the game medium granted by the movement based on another mode. In the present embodiment, when the movement distance is the same, the in-game value of the game medium to be granted when the movement is made in the mode corresponding to the moving means becomes higher as compared with a case where the movement is made in the walking mode. That is, the advantage degree can be increased in a case where the movement is made in the mode corresponding to the moving means as compared with a case where the movement is made in the walking mode. In addition, among the modes corresponding to the moving means, the advantage degree can be increased when the movement is made in the drive mode as compared with a case where the movement is made in the mode corresponding to other moving means than the drive mode. As a result, even when the movement distance is the same, the advantage degree is the highest in the drive mode, and then the second highest advantage degree is in the other mode, and the lowest advantage degree is in the walking mode.

Note that also in step S45, it is not limited to a reward being granted based on the right or the like granted during the mode which has ended, but in addition to this, a reward is granted according to a total movement distance during the mode. Also in this case, the advantage degree of the reward to be granted is set to be higher as the total movement distance becomes longer, but even when the total movement distance is the same, the advantage degree may be set as follows: the drive mode>the mode corresponding to other moving means (such as the train)>the walking mode.

In addition, in step S45, a specific image is displayed on the display unit 15. Information such as the movement distance during the selected mode, the right granted during the movement, the game medium to be granted according to the selected mode, and the like are displayed on the specific image, for example (see FIG. 4E).

ADVANTAGES OF THE PRESENT EMBODIMENT

According to the present embodiment, by performing the touch operation on the car icon in the mode selection UI at the time of the start of the location-based game, the mode is shifted to the drive mode corresponding to the specific mode as illustrated in step S06 of FIG. 5. During the drive mode, as described in steps S06 to S18 of FIG. 5 or the like, the progress of the game is enabled (acquisition of the right or the like is enabled) without requiring an input operation from the user. In addition, during such a drive mode, the movement distance is identified in step S10 even in the case of the movement using the car as the moving means, and the game medium or the like for increasing the advantage degree of the user in the game according to the movement distance is granted when the drive mode is ended as illustrated in step S24. With this configuration, while looking-aside is prevented even in the case of the movement by the moving means such as the car, the movement distance can be reflected on an outcome of the game.

In addition, according to the present embodiment, as illustrated in step S04 of FIG. 5, by determining that the location of the terminal apparatus is in the static state, the input operation for shifting the mode to the drive mode is accepted as valid. As described in steps S03 to S06 of FIG. 5, to shift the mode to the drive mode, the input operation from the user and the location of the terminal apparatus being in the static state at the time of the acceptance of the input operation are required. When these two requirements are met, the shifting to the drive mode is enabled. In addition, during the drive mode, as illustrated in step S20 of FIG. 5, by determining that the location of the terminal apparatus is in the static state, the input operation for ending the drive mode is accepted as valid. As described in steps S19 to S22 of FIG. 5, to end the drive mode, the input operation from the user and the location of the terminal apparatus being in the static state at the time of the acceptance of the input operation are required. When these two requirements are met, the drive mode can be ended. With this configuration, while moving by car or the like, it is possible to prevent the input operation for shifting the mode to the drive mode or the input operation for ending the drive mode by looking aside towards the display unit 15 from happening.

According to the present embodiment, as illustrated in step S07 of FIG. 5, the announcement by the display unit 15 is switched to the announcement using the voice. During the drive mode, as described in step S13, S14, S17, S18, or the like, the right or the like is granted during the drive mode according to the movement of the terminal apparatus 100 during the drive mode without requiring an input from the user. As illustrated in step S23, when the drive mode is ended, the game medium corresponding to the right granted during the drive mode is granted, and the advantage degree of the user in the game is increased. With this configuration, the user can concentrate on driving during the drive mode, and can be allowed to have a sense of expectancy for increasing the advantage degree in the game since the reward is to be granted after the end of the drive mode.

In addition, according to the present embodiment, when the right is granted to the user during the drive mode, as illustrated in step S14, S18, FIG. 4D, or the like, by outputting the sound without changing the display of the display unit 15, an effect that the right or the like is granted is announced to the user. With this configuration, the user can recognize the progress of the game without paying attention to the display unit 15.

According to the present embodiment, as illustrated in steps S15 and S16, without requiring an input operation from the user, the announcement is made to the user by the sound according to the presence of the terminal apparatus possessed by another user within a predetermined range from the location of the terminal apparatus 100 on the predetermined map during the drive mode. With this configuration, the user can recognize that the other user is present nearby without paying attention to the display unit 15.

According to the present embodiment, during the drive mode, the information that should be announced to the user according to the progress of the game or the like is announced by sound from the speaker, and in step S09, an image such as the map image which does not directly affect the progress or the result of the game is displayed on the display unit 15. With this configuration, it is possible to reduce a chance that the user pays attention to the display unit 15.

According to the present embodiment, as illustrated in step S23, as the movement distance of the terminal apparatus 100 during the drive mode becomes longer, the advantage degree for the user is increased. With this configuration, the motivation for the user to make the movement using the drive mode corresponding to the car is improved.

In addition, according to the present embodiment, a plurality of modes based on the moving means are provided according to the types of the moving means that may be used by the user, and the shifting step includes shifting to any of the plurality of modes. In addition, even when the movement distance of the terminal apparatus is the same, as described in step S23 or S45, the advantage degree to be increased is different according to the type of the shifting mode. With this configuration, a motivation for the user to move a long distance using the mode corresponding to the moving means with a high advantage degree is improved.

According to the present embodiment, as illustrated in steps S03 and S30, by selecting the moving means to be used, the mode is shifted to the mode corresponding the moving means. With this configuration, it is possible to enable the user to easily recognize the mode selection.

According to the present embodiment, as illustrated in step S08 or S31, during a mode using the moving means, BGM according to the mode is output. With this configuration, the user can further enjoy the movement using the moving means by listening to the corresponding music.

According to the present embodiment, as illustrated in step S09, a map image of a specific range according to the location of the terminal apparatus 100 in the predetermined map image and also the second object 301 corresponding to the user at the location of the terminal apparatus 100 are displayed on the display unit 15, and when the terminal apparatus possessed by another user is present within the specific range, the third object 302 corresponding to the other user is displayed at the location according to the terminal apparatus. With this configuration, the user can recognize that the other user is present nearby.

According to the present embodiment, the information that should be announced to the user according to the progress of the game or the like may be announced not only by the speaker but also by the image using the display unit 15 during the mode other than the drive mode, while it is announced by the sound using the speaker during the drive mode as illustrated in step S07. The information that should be announced to the user according to the progress of the game or the like includes information with which the progress status of the game is identifiable as illustrated in step S12, S14, S18, or the like. As a result, it is possible to switch to the announcement mode suitable for the moving means used by the user, so that it is possible to recognize the progress status while the progress of the game is made without looking at the display unit 15 even during the drive mode in which the user themselves drives, and the safety of the user during the movement can be improved.

MODIFIED EXAMPLES

Modified examples or the like of the embodiments described above will be listed below.

(1) An example has been described in which in step S02 of FIG. 5 in the above mentioned embodiment, the moving means is selected according to an input operation by the user, and the mode is shifted to the mode according to the selected moving means. However, an average moving speed may be calculated from the movement distance of the terminal apparatus 100 in a predetermined period of time (for example, 30 minutes) since the start of the location-based game to estimate a type of the moving means corresponding to the moving speed (for example, the car when the moving speed is 40 km per hour, the airplane when the moving speed is 500 km per hour, or the like), and the mode may be automatically shifted to the mode according to the moving means. In addition, even after the mode is shifted to any of the plurality of types of modes based on the input operation by the user or the like, an average moving speed may be calculated from the movement distance of the terminal apparatus 100 in a predetermined period of time (for example, the last 30 minutes) during the mode to determine whether the moving speed is within a range of the average moving speed of the moving means corresponding to the current mode (for example, the range of the average moving speed is 30 km to 60 km per hour in the case of the car, 400 km to 900 km per hour in the case of the airplane, or the like), and when the moving speed is not within the range of the average moving speed, the mode may be switched to the mode according to the type of the moving means in which the average moving speed is within the range. With this configuration, the mode can be shifted to the mode corresponding to the moving means according to the actual moving speed, and it is possible to prevent the grant of the reward when the location-based game is played in a mode different from the actual moving means due to a cheat or the like by the user.

(2) In the above described embodiment, an example has been described in which the reward such as the game medium is granted according to the movement distance or the like without setting a destination. However, a destination may be set, and a reward according to the destination (for example, a game medium, a local item according to the destination, or the like) may be granted to the user by reaching the destination. With this configuration, in addition to the reward (the reward or the like granted in step S23 or S45) such as the game medium granted according to the movement until the destination is reached, it is possible to increase the motivation for reaching the destination by setting the destination since a reward according to the destination can be separately acquired when the destination has been reached.

(3) In the above described embodiment, with regard to the movement using the car, an example has been described in which it is assumed that the user themselves drives the car to make the movement. However, with regard to the movement using the car, modes corresponding to each of a case where the user themselves drives (a private car or the like) and a case where the user themselves does not drive (a bus, a taxi, or the like) may be provided. For example, when the user themselves does not drive, a configuration may be adopted where the mode can be selected as a mode different from the drive mode (for example, a ride share mode or the like). Note that in the ride share mode, similarly to the mode corresponding to the train or the like, the same processing as steps S31 to S36, S44, and S45 may be performed.

(4) In the above described embodiment, the drive mode corresponding to the car is exemplified as the specific mode. However, the mode corresponding to the train, the ship, the airplane, or the like may be included in the specific mode.

That is, also during the mode in which the train, the ship, the airplane, or the like is selected, similarly to the drive mode, the processing corresponding to steps S03 to S23 may be performed.

(5) In the above described embodiment, in step S32, an example has been described in which it is determined whether the track of the terminal apparatus 100 in another mode is consistent with the track of the moving means (mode). However, also in the drive mode, it may be determined whether the track of the terminal apparatus 100 is consistent with the track (roadway) of the moving means. Note that when it is not determined that the tracks are consistent, the mode may be shifted to a mode consistent with the track (for example, permanent way: train, sea: ship, or the like), may be shifted to the walking mode, or the flow may be shifted to step S01 for selecting the mode again.

(6) In the above described embodiment, an example has been described in which by performing an input operation on the icon 311 (static state is assumed during the drive mode), the specific image including the reward to be granted or the like is displayed to end the location-based game. However, by performing the input operation on the icon 311 (static state is assumed during the drive mode), the specific image including the reward to be granted or the like according to the movement up to the current moment may be displayed, and also an end icon and an resumption icon (for example, an icon corresponding to the selected mode, for example, an icon of a car in the case of the drive mode) may be displayed. By performing the input operation on the end icon (static state is assumed during the drive mode), the location-based game may be ended. On the other hand, by performing the input operation on the resumption icon (static state is assumed during the drive mode), the location-based game may be resumed (also continuously identifying the movement distance or the like) to be able to continue thereafter. With this configuration, after the specific image is checked, whether to continuously perform or end the location-based game can be decided by the intention of the user, and convenience can be improved. Note that when the specific image including the reward to be granted according to the movement up to the current moment or the like is displayed by performing the input operation on the icon 311, the mode selection UI illustrated in FIG. 4A may be displayed, and the moving means (mode) may be changed (reselected) by the touch operation in the mode selection UI such that the location-based game may be resumed. With this configuration, while the moving means is changed in mid-course, the location-based game can be continued.

(7) In the above described embodiment, an example has been described in which during the drive mode, the mode is not changed until the input operation on the icon 311 is performed. However, as illustrated in step S10 in a predetermined period of time during the drive mode (30 minutes from the start, the latest 30 minutes, or the like), an average moving speed during the drive mode may be calculated from the identified movement distance of the terminal apparatus 100, and when the moving speed is not within a range of the moving speed preset in the drive mode, the mode may be shifted to a mode according to the type of the moving means in which the average moving speed is within the range, or the flow may be shifted to step S02 for selecting the mode again.

(8) During the drive mode in the above mentioned embodiment, an example has been described in which when a terminal apparatus possessed by another user is present in FIG. 4B and FIG. 4C, a third object 302 is displayed at the location corresponding to the terminal apparatus. However, during the drive mode, even when the terminal apparatus possessed by another user is present, without displaying the third object 302 on the display unit 15, only sound with which that effect is identifiable may be output from the speaker. Furthermore, on condition that the user having heard the sound stops the car to put the terminal apparatus 100 in the static state, the third object 302 may be displayed on the display unit 15. With this configuration, while the safety is guaranteed, the location of the other user can be recognized.

Supplementary Notes

Supplementary notes of the items described in the above respective embodiments will be mentioned below.

Supplementary Note 1:

According to an aspect of an embodiment illustrated in the present disclosure, there is provided a recording medium having recorded thereon a game program to be executed in a terminal apparatus including a processor, a memory, an input unit, an output unit, and a display unit, wherein a game based on the game program includes a game configured to progress by moving a location of a terminal apparatus possessed by a user, the game program causing the processor to perform enabling the game to progress by using predetermined moving means to move the terminal apparatus by the user who possesses the terminal apparatus (steps S07 to S18), and announcing information for the user using the display unit in a non specific mode other than during a game progressing by using the predetermined moving means to move the location of the terminal apparatus, and announcing the information for the user using an output unit other than the display unit in a specific mode during the game progressing by using the predetermined moving means to move the location of the terminal apparatus (steps S11 to S18).

Supplementary Note 2:

According to Supplementary note 1, the output unit is an output unit configured to output sound, and the announcing (steps S11 to S18) includes announcing by outputting sound according to the information for the user from the output unit in the specific mode.

Supplementary Note 3:

According to Supplementary note 2, the information for the user includes information with which a progress status of the game is identifiable (step S12).

Supplementary Note 4:

According to any one of Supplementary note 1 to Supplementary note 3, the enabling the game to progress (step S07) includes granting, during the specific mode, a right according to a movement of the terminal apparatus during the specific mode (step S14), and the game program causes the processor to perform enabling an increase in an advantage degree of the user in the game according to the right in response to the right having been granted when the specific mode is ended (step S23).

Supplementary Note 5:

According to any one of Supplementary note 1 to Supplementary note 4, the announcing (steps S11 to S18) includes outputting sound according to a presence of a terminal apparatus possessed by another user within a predetermined range from the location of the terminal apparatus on a predetermined map during the specific mode (step S16).

Supplementary Note 6:

According to any one of Supplementary note 1 to Supplementary note 5, a predetermined mode corresponding to moving means different from the predetermined moving means is provided, the game program causes the processor to perform shifting to any of a plurality of types of modes including the specific mode and the predetermined mode by accepting an input from the user (step S03), and the announcing (step S08) includes, during a shifted mode, outputting sound according to a type of the mode (steps S08, S31, and S37).

Supplementary Note 7:

According to Supplementary note 6, in the shifting (step S03), an input for shifting to the specific mode is acceptable when a mode is not the specific mode and the location of the terminal apparatus is in a static state, and the input for shifting to the specific mode is not accepted when the location of the terminal apparatus is not in the static state even when the mode is not the specific mode (step S04).

Supplementary Note 8:

According to an aspect of an embodiment illustrated in the present disclosure, there is provided a game method performed in a terminal apparatus including a processor, a memory, an input unit, an output unit, and a display unit, wherein a game based on the game method includes a game configured to progress by moving a location of a terminal apparatus possessed by a user, and the game method includes enabling, by the terminal apparatus, the game to progress by using predetermined moving means to move the terminal apparatus by the user who possesses the terminal apparatus (steps S07 to S18), and announcing, by the terminal apparatus, information for the user using the display unit in a non specific mode other than during a game progressing by using the predetermined moving means to move the location of the terminal apparatus, and announcing, by the terminal apparatus, the information for the user using an output unit other than the display unit in a specific mode during the game progressing by using the predetermined moving means to move the location of the terminal apparatus (steps S11 to S18).

Supplementary Note 9:

According to an aspect of an embodiment illustrated in the present disclosure, there is provided a terminal apparatus including a storage unit configured to store a game program, and a control unit configured to control an operation of the terminal apparatus by executing the game program, in which a game based on the game program includes a game configured to progress by moving a location of a terminal apparatus possessed by a user, and the control unit causes the processor to perform enabling the game to progress by using predetermined moving means to move the terminal apparatus by the user who possesses the terminal apparatus (steps S07 to S18), and announcing information for the user using a display unit in a non specific mode other than during a game progressing by using the predetermined moving means to move the location of the terminal apparatus, and announcing the information for the user using an output unit other than the display unit in a specific mode during the game progressing by using the predetermined moving means to move the location of the terminal apparatus (steps S11 to S18).

Implementation Examples by Software

The control in each of the terminal apparatus 100 and the server 200 may be achieved by a logic circuit (hardware) formed on an integrated circuit (IC chip) or may be achieved by software.

In the latter case, the terminal apparatus 100 and the server 200 include a computer configured to perform a command of a program corresponding to software configured to achieve each of the functions. This computer includes, for example, one or more processors, and also includes a computer readable recording medium storing the program. Then, in the computer, when the processor reads the program from the recording medium to execute the program, so that an aim of the present invention is accomplished. For example, a central processing unit (CPU) can be used as the processor. A "non-transitory tangible medium" such as, for example, in addition to a read only memory (ROM) or the like, a tape, a disk, a card, a semiconductor memory, a programmable logic circuit, or the like can be use as the recording medium. In addition, a random access memory (RAM) or the like configured to develop the program may further be provided. In addition, the program may be supplied to the computer via any transmission medium (a network, a broadcast wave, or the like) capable of transmitting the program. Note that an aspect of the present invention may be achieved in a form of a data signal embedded in a carrier wave which is realized when the program is realized by electronic transmission.

The present invention is not limited to the embodiments described above, and various alterations can be made within a range illustrated in claims. An embodiment obtained by an appropriate combination of technical means disclosed in each of different embodiments is also included in the technical scope of the present invention.

EXPLANATION OF REFERENCES 1 game system, 2 network, 10, 20 processor, 11, 21 memory, 12, 22 storage, 15 display unit, 151 input unit, 152 display unit, 17 camera, 18 distance measuring sensor, 1010 object, 1020 controller, 1030 storage medium, 100 terminal apparatus, 200 server, 120, 220 storage unit, 121, 221 game program, 122, 222 game information, 123, 223 user information, 110, 210 control unit, 111 game progress processing unit, 112 input operation acceptance unit, 113 camera arrangement control unit, 114 display control unit, 115 object control unit, 211 transmission and reception unit, 212 server processing unit, 213 data management unit, 214 synchronization processing unit, 300 first object, 301 second object, 302 third object, 310 icon indicating currently performed mode, 311 icon for ending mode

What is claimed is:

1. A non-transitory recording medium having recorded thereon a game program comprising a set of computer-readable instructions executable on a processor of a terminal apparatus including the processor, a memory, an input device, an output device, and a display device, wherein a game based on the game program includes a game configured to progress by moving a location of the terminal apparatus possessed by a user, the game program causing the processor to perform:

accepting user input from the terminal apparatus indicative of a moving means selected from a plurality of moving means presented to the user;

enabling the game to progress by using the selected moving means to move the location of the terminal apparatus possessed by the user during the game and announcing information for the user using the display device in a non-specific mode associated with the selected moving means; and responsive to accepting the user input associated with the selected moving means indicative of a specific mode, shifting to announcing the information for the user using an output device other than the display device while continuing to display other game-related information using the display device;

wherein the specific mode is associated with the user operating a vehicle.

2. The recording medium according to claim 1, wherein
the output device is an output device configured to output sound, and
the announcing includes announcing by outputting sound according to the information for the user from the output device in the specific mode.

3. The recording medium according to claim 2, wherein the information for the user includes information with which a progress status of the game is identifiable.

4. The recording medium according to claim 1, wherein
the enabling the game to progress includes granting, during the specific mode, a right according to a movement of the terminal apparatus during the specific mode, and
the game program causes the processor to perform
enabling an increase in an advantage degree of the user in the game according to the right in response to the right having been granted when the specific mode is ended.

5. The recording medium according to claim 2, wherein
the enabling the game to progress includes granting, during the specific mode, a right according to a movement of the terminal apparatus during the specific mode, and
the game program causes the processor to perform
enabling an increase in an advantage degree of the user in the game according to the right in response to the right having been granted when the specific mode is ended.

6. The recording medium according to claim 3, wherein
the enabling the game to progress includes granting, during the specific mode, a right according to a movement of the terminal apparatus during the specific mode, and
the game program causes the processor to perform
enabling an increase in an advantage degree of the user in the game according to the right in response to the right having been granted when the specific mode is ended.

7. The recording medium according to claim 1, wherein the announcing includes outputting sound according to a presence of a terminal apparatus possessed by another user within a predetermined range from the location of the terminal apparatus on a predetermined map during the specific mode.

8. The recording medium according to claim 2, wherein the announcing includes outputting sound according to a presence of a terminal apparatus possessed by another user within a predetermined range from the location of the terminal apparatus on a predetermined map during the specific mode.

9. The recording medium according to claim 3, wherein the announcing includes outputting sound according to a presence of a terminal apparatus possessed by another user within a predetermined range from the location of the terminal apparatus on a predetermined map during the specific mode.

10. The recording medium according to claim 4, wherein the announcing includes outputting sound according to a presence of a terminal apparatus possessed by another user within a predetermined range from the location of the terminal apparatus on a predetermined map during the specific mode.

11. The recording medium of claim 1, wherein the other game-related information displayed using the display device includes map information.

12. A game method performed by a processor in a terminal apparatus including the processor, a memory, an input device, an output device, and a display device, wherein
a game based on the game method includes a game configured to progress by moving a location of the terminal apparatus possessed by a user, and
the game method includes:
accepting, by the terminal apparatus, user input indicative of a moving means selected from a plurality of moving means presented to the user;
enabling, by the terminal apparatus, the game to progress by using the selected moving means to move the location of the terminal apparatus possessed by the user during the game;
announcing, by the terminal apparatus, information for the user using the display device in a non-specific mode associated with the selected moving means; and
responsive to accepting the user input associated with the selected moving means indicative of a specific mode, shifting to announcing, by the terminal apparatus, the information for the user using an output device other than the display device while continuing to display other game-related information using the display device;
wherein the specific mode is associated with the user operating a vehicle.

13. A terminal apparatus comprising:
a storage device configured to store a game program; and
a control unit that uses a processor to control an operation of the terminal apparatus by executing the game program, wherein
a game based on the game program includes a game configured to progress by moving a location of the terminal apparatus possessed by a user, and
the control unit causes the processor to perform
accepting user input from the terminal apparatus indicative of a moving means selected from a plurality of moving means presented to the user;
enabling the game to progress by using the selected moving means to move the location of the terminal apparatus possessed by the user during the game;
announcing information for the user using a display device in a non-specific mode associated with the selected moving means; and
responsive to accepting the user input associated with the selected moving means indicative of a specific mode, shifting to announcing the information for the user using an output device other than the display device while continuing to display other game-related information using the display device;
wherein the specific mode is associated with the user operating a vehicle.

* * * * *